(12) United States Patent
Schechter

(10) Patent No.: US 7,789,181 B1
(45) Date of Patent: Sep. 7, 2010

(54) OPERATING A PLUG-IN AIR-HYBRID VEHICLE

(76) Inventor: Michael Moses Schechter, 31110 Country Ridge Cir., Farmington Hills, MI (US) 48331

(*) Notice: Subject to any disclaimer, the term of this patent is extended or adjusted under 35 U.S.C. 154(b) by 108 days.

(21) Appl. No.: 12/221,405

(22) Filed: Aug. 4, 2008

(51) Int. Cl.
*B60K 6/12* (2006.01)
(52) U.S. Cl. ..................................... 180/165
(58) Field of Classification Search ............. 180/165, 180/69.4, 69.5; 123/188.2, 90.12, 527, 531; 60/712; 417/203
See application file for complete search history.

(56) References Cited

U.S. PATENT DOCUMENTS

| | | | | |
|---|---|---|---|---|
| 3,980,152 A | * | 9/1976 | Manor | 180/313 |
| 4,355,508 A | * | 10/1982 | Blenke et al. | 60/416 |
| 4,370,857 A | * | 2/1983 | Miller | 60/413 |
| 4,478,304 A | * | 10/1984 | Delano | 180/165 |
| 6,094,915 A | | 8/2000 | Negre et al. | |
| 6,223,846 B1 | | 5/2001 | Schechter | |
| 6,305,171 B1 | | 10/2001 | Negre et al. | |
| 6,311,486 B1 | | 11/2001 | Negre et al. | |
| 6,327,858 B1 | | 12/2001 | Negre et al. | |
| 6,334,435 B1 | | 1/2002 | Negre et al. | |
| 6,363,723 B1 | | 4/2002 | Negre et al. | |
| 6,629,573 B1 | * | 10/2003 | Perry | 180/54.1 |
| 6,695,591 B2 | * | 2/2004 | Grimmer et al. | 417/203 |
| 7,231,998 B1 | | 6/2007 | Schechter | |

* cited by examiner

*Primary Examiner*—Frank B Vanaman

(57) ABSTRACT

A vehicle system includes an engine that can operate as a compressor, as an air motor and an internal-combustion engine. It also includes short-term and long-term air-storage reservoirs filled with compressed air. During braking, the engine slows down the vehicle by pumping compressed air into the short-term storage. That air is later used for vehicle propulsion. The engine uses the recovered braking energy whenever possible, but when the compressed air in the short-term storage is exhausted; it switches to the long-term storage and continues to operate with compressed-air assist. The amount of compressed air in the long-term storage is such that it is sufficient for a typical day of driving. An on-board electrically-driven compressor, using an outside source of electric power, charges the long-term storage during overnight parking. In this way, electric power from an electric grid is indirectly used for vehicle propulsion. If the compressed air in both reservoirs is exhausted, the engine switches to internal-combustion.

10 Claims, 26 Drawing Sheets

OPERATING A PLUG-IN AIR-HYBRID VEHICLE

CROSS-REFERENCE TO RELATED APPLICATIONS

Ser. No. 11/731,841, filed Apr. 2, 2007 by the present inventor

FEDERALLY SPONSORED RESEARCH

Not applicable

SEQUENCE LISTING OR PROGRAM

Not applicable

FIELD OF THE INVENTION

The present invention relates to vehicle systems capable to accumulate energy derived from vehicle motion during its deceleration or obtained from operation of the vehicle engine, and use the accumulated energy to assist in vehicle acceleration and propulsion at a later time. It also relates to vehicle systems capable to receive and accumulate energy from an outside energy source when the vehicle is not in motion, and use the accumulated energy to assist in vehicle propulsion when the vehicle is in motion.

BACKGROUND OF THE INVENTION

Most automotive vehicles are propelled by internal combustion engines consuming hydrocarbon fuels. Burning these fuels produces exhaust gas containing harmful air-pollutants, such as carbon monoxide, nitrogen oxides, and unburned hydrocarbons. It also contains substantial amount of carbon dioxide which, if produced in large quantities worldwide over long period of time, can contribute to an undesirable increase in average global temperature. Concern for clean air and a desire to prevent adverse consequences of man-made global warming dictate a need to substantially improve fuel efficiency of automotive vehicles.

By itself, the internal combustion engine is a reasonably efficient machine. Unfortunately, the driving pattern of most automotive vehicles is such, that a substantial fraction of energy produced by their engines is wasted. Typically, the driving pattern involves frequent accelerations, each followed by a deceleration. Each acceleration involves a significant increase in fuel consumption needed to produce the additional energy necessary to increase the vehicle speed. Then, during a subsequent deceleration, this added energy is absorbed by vehicle brakes and dissipated as heat.

Attempts to overcome such waste of energy led to development of systems in which the energy of vehicle motion is not dissipated during braking, but converted into a form in which it can be temporarily stored and, then, used again to accelerate the vehicle at a later time. Typically, such system includes an internal combustion engine, an energy storage, and a second propulsion system that absorbs the energy of vehicle motion and deposits it into the storage during braking. During subsequent acceleration, the second propulsion system receives energy from the energy storage and uses it to supplement the work of the internal combustion engine. Such systems are known as hybrid vehicle systems. An electric hybrid includes an electric generator/motor as a second propulsion system, and an electric battery for energy storage. A fluid-power hybrid includes a pump/motor and a pressurized-fluid accumulator. A flywheel hybrid includes a variable-ratio transmission and a flywheel.

Air hybrid differs from most other hybrid systems in that it does not require a second propulsion system. Instead, the vehicle engine performs both absorption and recovery of braking energy, using compressed air for energy storage and, later, for compressed-air assist. Elimination of the need for a second propulsion system leads to a substantial reduction in cost and complexity of the hybrid system.

An air-hybrid system can substantially reduce the vehicle fuel consumption during braking and acceleration. There is, however, no improvement when the vehicle is cruising with approximately constant speed, because the compressed air accumulated during braking is completely spent for compressed-air assist during subsequent acceleration. Much greater fuel economy benefit could be achieved if compressed-air assist were available during both acceleration and cruise. This can be accomplished by providing the vehicle with an auxiliary reservoir filled with compressed air that can be used for compressed-air assist when compressed air accumulated during braking is not available. Such auxiliary reservoir can be periodically recharged with compressed air by using an outside source of energy when the vehicle is not in motion.

Typically, such system can use an electrically-driven on-board compressor that can be connected to an outside source of electric power when the vehicle is parked in the owner's garage or elsewhere. In this way, electric power from an electric grid is indirectly used for air-hybrid vehicle propulsion replacing some of the hydrocarbon fuel. This is the concept of the plug-in air hybrid. Since electric power is substantially less expensive than the hydrocarbon fuel it replaces, using the plug-in air hybrid for vehicle propulsion provides substantial operational cost savings to the vehicle owner. It also reduces the amount of harmful exhaust pollutants associated with hydrocarbon fuel combustion.

A plug-in air-hybrid system that combines the concept of saving the vehicle braking energy as compressed air and using it for subsequent compressed-air assist with the concept of an additional compressed-air assist provided by an on-board rechargeable compressed-air reservoir using an outside source of energy for its periodic recharging with compressed air is the subject of the present invention.

PRIOR ART

A concept of air-hybrid vehicle that can accumulate energy of vehicle braking, store it as compressed air and use it to assist in subsequent vehicle acceleration has been proposed before. U.S. Pat. No. 6,223,846 and No. 7,231,998 to Schechter describe such system and method. In the concepts of the above patents, the vehicle engine operates, during braking, as a compressor pumping compressed air into a short-term storage reservoir. That compressed air is later used to assist in vehicle acceleration. This contributes to improvement in the vehicle fuel economy.

A significant drawback of the above concept is the fact that it is mostly useful only in driving in crowded city-streets environment, where a typical pattern of driving includes frequent braking, stops and accelerations. When the vehicle is driven with approximately constant speed, as is the case in expressway or highway driving, the energy recovery action is seldom applicable. This severely limits the benefits of the concepts described in the above patents.

The present invention describes a method to overcome the above limitation. It describes a concept of a vehicle that, in addition to all the features of conventional air hybrid, also includes a large long-term storage reservoir containing a large supply of highly-compressed air that can be used to assist the engine in vehicle propulsion on a continuous basis. The engine uses the recovered braking energy whenever possible, but when the supply of compressed air in the short-term storage reservoir is exhausted; it switches to the long-term reservoir and continues to operate with compressed-air assist.

The amount of compressed air in the long-term storage reservoir is such that it is sufficient for continuous compressed-air assist during, at least, a typical day of driving. However, if the supply of compressed air is exhausted, the engine can switch to operating as a conventional internal-combustion engine using hydrocarbon fuel.

Also included in the vehicle is an on-board compressor for periodic recharging of the long-term storage reservoir. The compressor is driven by an electric motor that can be plugged-in into an outside source of electric power when the vehicle is not in motion. Typically, the long-term storage reservoir is recharged during an overnight parking in the car owner's garage equipped with a power outlet. Then, the next day, the vehicle is driven all day mostly using the energy of compressed air for its propulsion, with the hydrocarbon fuel playing a supplementary role. In this way, electric power from an electric grid is indirectly used for air-hybrid vehicle propulsion replacing some of the hydrocarbon fuel. Since electric power is substantially less expensive than the hydrocarbon fuel it replaces, using the plug-in air hybrid for vehicle propulsion provides substantial operational cost savings to the vehicle owner.

The plug-in air hybrid described in the present invention represents a substantial improvement over a conventional air hybrid described in the above patents. By using energy of stored compressed air to continuously assist in vehicle propulsion, the plug-in air hybrid can substantially reduce the amount of hydrocarbon fuel used to drive the vehicle. Hydrocarbon fuels are becoming increasingly expensive and, since they are a major import item in most developed countries, their cost is a major contributor to the U.S. negative balance of payments. A plug-in air hybrid replaces energy derived from hydrocarbon fuel by energy derived from other sources, and if used on a large scale, can contribute to a significant reduction in crude oil import and in an improvement in the U.S. balance of payments.

An engine connected to a storage reservoir filled with compressed air that can be used for engine operation has been proposed before. U.S. Pat. No. 6,363,723: No. 6,334,435; No. 6,327,858; No. 6,311,486; No. 6,305,171; and No. 6,094,915 to Negre et al describe several versions of such proposal.

Common to most of the above patents is the basic engine structure that includes three separate and entirely self-contained portions: a compression chamber, a combustion chamber, and an expansion chamber. Atmospheric air is inducted into and compressed in the compression chamber, and it is transferred into the combustion chamber. Fuel injection and combustion may or may not take place there. An additional charge of compressed air from a compressed-air reservoir is injected into the combustion chamber, and the combined air charge is transferred into the expansion chamber and expands there. There are separate and different pistons, connecting rods and crankshafts for the compression and expansion chambers. No piston in the combustion chamber. Both crankshafts are connected to each other by a mechanical link. Such engine structure is fundamentally different from the structure of commonly used internal-combustion engines, in which there is only one common chamber for compression, combustion and expansion; only one set of pistons and connecting rods, and only one crankshaft. It is a very complicated structure and much more expensive than a conventional engine.

In contrast to the above patents, the present invention describes an air-hybrid system that includes a conventional-type engine with a single intake/compression/combustion/expansion chamber and with a single piston and a single connecting rod in each cylinder. All cylinders are identical, and both compression and expansion take place in the same cylinder chamber. In the case of two-stage operation, either both the primary and secondary cylinders perform air compression or they both perform air expansion, depending on the mode of the engine operation. There is no need for two crankshafts connected by a linkage. Whenever necessary, the engine turns into a conventional internal-combustion engine, in which all cylinders perform identical internal-combustion cycle. The modification that enables the engine to selectively operate as a compressor, as an air motor and as an internal-combustion engine is mostly limited to changes in the gas-exchange control system. Therefore, the cost of such air-hybrid engine is not much different from the cost of conventional engine. Moreover, any existing conventional engine can be modified into an air-hybrid engine of the present invention with only modest cost involved. No conventional engine can be modified into the engine described in the above patent.

U.S. Pat. No. 6,305,171 and No. 6,327,858 to Negre's et al describe a heater for heating the air flowing from the high-pressure reservoir. The heater, as shown in the drawings, is a thermal conduction device, in which a hot combustion gas surrounds a pipe carrying cold compressed air and transfers some of its heat to the compressed air through the wall of the pipe. The above method of thermal conduction is inefficient in that only a fraction of the heat generated in the burner can be transferred to the compressed air.

In contrast to the above patents, the present invention describes an air heater, in which fuel is added to a fraction of the main compressed-air flow and burned within that fraction of the flow. The resulting hot combustion gas is added to the rest of the air flow thus raising its temperature. This method is very efficient because all the heat generated in the burner is transferred to the compressed air.

The U.S. Pat. No. 6,363,723 to Negre's et al describes a system that includes an on-board compressor that can perform vehicle braking. The compressor can be connected to the vehicle transmission via a clutch. During braking, the clutch is engaged and the compressor pumps compressed air into a reacceleration reservoir. Work of the compressor decelerates the vehicle. During subsequent acceleration, compressed air from the reacceleration reservoir flows through a separate pipe into the engine combustion chamber. That combustion chamber is separate from the compression chamber and from the expansion chamber. Then, a shot of compressed air from the main compressed-air reservoir is injected into the combustion chamber, is mixed with the air there, and the combined air charge is transferred into the separate expansion chamber and expands there.

In contrast to the above patent, the present invention does not contemplate using a separate compressor for vehicle braking. The engine is designed to selectively operate in several different operational modes, and one of them is compression-braking mode, in which the engine operates as a compressor. During vehicle braking, the engine operates as a compressor inducting atmospheric air into its cylinders, compressing it there, and transferring it into a short-term storage reservoir. During acceleration, that compressed air is returned to the engine cylinders, where it participates in the performance of the air-motor or the air-power-assist cycles.

Using the engine as a compressor is a substantial improvement and simplification. There is no need for a separate compressor. Although an on-board braking compressor can also be used to fill the long-term storage reservoir, it is often sensible to install the compressor for filling the long-term storage reservoir in a stationary location outside the vehicle. Also, there is no need for the special clutch and associated components for connecting the braking compressor to the transmission. It is also an advantage that the compressed air pumped by the engine flows into the short-term storage reservoir and back through the same ducts, which simplifies the system.

The present invention has numerous other differences from and advantages over the Negre's patents. Some of them are listed below:

The air-hybrid engine of the present invention can selectively operate as a compressor, as an air-motor, and as an internal-combustion engine. The engine of the above patents cannot operate as a compressor.

The air-hybrid engine of the present invention can selectively operate as a four-stroke and as a two-stroke internal-combustion engine. The engine of the above patents doesn't have such flexibility.

The air-hybrid engine of the present invention can be used as an electrically-driven compressor charging the long-term storage reservoir with compressed air. The engine of the above inventions can not do this.

The air-hybrid engine of the present invention can be switched to operating as a conventional internal-combustion engine, in which all cylinders perform the same internal-combustion cycle. The engine of the above inventions can not do this.

The air-hybrid engine of the present invention can operate with a two-stage air compression and a two-stage air expansion, which reduces the required size of the short-term storage reservoir. The engine of the above inventions can not operate that way.

The air-hybrid engine of the present invention can operate in a heat-conservation mode, in which the heat of combustion is used to heat the compressed air. The concepts of the above patents do not include such feature.

The system of the present invention can accumulate and recover potential energy of the vehicle during its descent and ascent in the mountains. The concepts of the above patents do not anticipate such operation.

In the concept of the present invention, the long-term storage reservoir can be charged with compressed air from an outside compressed-air reservoir. The concepts of the above patents do not contemplate such possibility.

OBJECTS AND ADVANTAGES

One object of the present invention is to reduce the cost of driving the vehicle. In a plug-in air-hybrid vehicle, some of the hydrocarbon fuel used to drive it is replaced by compressed-air assist provided by using energy of compressed air stored in a long-term storage air reservoir. That reservoir is periodically recharged with compressed air by a compressor driven by an outside source of electric energy when the vehicle is not in motion. In this way, electric power from an electric grid is indirectly used for air-hybrid vehicle propulsion replacing some of the hydrocarbon fuel. Since electric power is substantially less expensive than the hydrocarbon fuel it replaces, using the plug-in air hybrid for vehicle propulsion provides substantial operational cost savings to the vehicle owner.

Another object of the present invention is to reduce the amount of hydrocarbon fuel used to drive the vehicle. Hydrocarbon fuels are becoming increasingly expensive and, since they are a major import item in most developed countries, their cost is a major contributor to the U.S. negative balance of payments. A plug-in air hybrid replaces energy derived from hydrocarbon fuel by energy derived from other sources, and if used on a large scale, can contribute to a significant reduction in crude oil import and in an improvement in the U.S. balance of payments.

A further object of the present invention is to reduce the amount of harmful pollutants emitted by the vehicle. Most automotive vehicles are propelled by internal combustion engines consuming hydrocarbon fuels. Burning these fuels produces exhaust gas containing harmful air-pollutants, such as carbon monoxide, nitrogen oxides, and unburned hydrocarbons. It also contains substantial amount of carbon dioxide which, if produced in large quantities worldwide over long period of time, can contribute to an undesirable increase in average global temperature. A plug-in air hybrid replaces some of the hydrocarbon fuel energy with energy of compressed air that is produced by using electric energy from a source outside of the vehicle. Using energy from outside of said vehicle leads to a substantial reduction in the vehicle exhaust emissions.

Yet another object of the present invention is to reduce the engine heat loss. Reducing the engine heat loss improves the engine fuel economy. During plug-in air hybrid operation involving a two-stage air expansion, the engine cooling system can be switched to a heat-conservation mode, in which heat removed from hot gas in an engine cylinder at the end of its cycle is transferred to cold air flowing into that cylinder at the beginning of a subsequent cycle. This leads to a substantial reduction in engine heat loss.

SUMMARY

The present invention contemplates a system for and a method of operating a vehicle on wheels. The system includes an air-hybrid engine capable to selectively operate in various operational modes. It can operate as a conventional internal-combustion engine, but it can also operate as a compressor. It can also operate as an air motor or concurrently as an internal-combustion engine and an air motor using compressed air to assist the engine operation. This is the operation with compressed-air assist.

Also included is a system of short-term and long-term air-storage reservoirs capable to receive, store and discharge compressed air. Each short-term storage reservoir receives and stores compressed air pumped by the engine during braking, when it operates as a compressor. The long-term storage reservoir contains an additional supply of compressed air that can be used for compressed-air assist when the supply of compressed air in the short-term storage reservoir has been exhausted.

There is also an electrically driven on-board compressor that can periodically recharge the long-term storage reservoir with compressed air when the vehicle is parked.

The overall system also includes a control system, which is an on-board computer capable to monitor the vehicle driver's demands and respond to them by controlling the operation of the engine and other vehicle components according to a program contained in its software.

During vehicle braking, the engine operates as a compressor driven by vehicle momentum. It inducts atmospheric air, compresses it and deposits the compressed air into the short-term storage reservoir. Both single stage and two-stage compression can be used. Work of compression slows down the vehicle, and the kinetic energy of vehicle motion is converted into energy of compressed air in the short-term storage reservoir.

During subsequent vehicle acceleration and propulsion, the engine operates as an air motor or concurrently as an internal combustion engine and an air motor. It receives compressed air from the short-term storage reservoir and uses it for compressed-air assist. When the supply of compressed air in the short-term storage reservoir is exhausted, the engine starts receiving compressed-air from the long-term storage reservoir and continues to operate with compressed-air assist.

The amount of compressed air in the long-term storage reservoir is such that it is sufficient for continuous compressed-air assist during a typical day of driving. However, if the supply of compressed air is exhausted, the engine can switch to operating as a conventional internal-combustion engine using hydrocarbon fuel.

Whenever the vehicle stops, the engine is shut down for the duration of the stop. This saves fuel. For resumption of driving, the engine can be re-started by using compressed air in the air-motor mode.

Whenever the vehicle is parked in the owner's garage or another suitable place with access to electric power, the onboard electrically driven compressor can be connected to the electric power supply for recharging the long-term storage reservoir with compressed air while the vehicle is parked.

DRAWINGS

DESCRIPTION OF A PREFERRED EMBODIMENT

FIGS. 1 to 4, 23 and 26

A preferred embodiment of the present invention is described below and it is illustrated in FIGS. 1 to 4, 23 and 26.

It includes two main variants: a single-stage compression system and a two-stage compression system.

Single-Stage Compression System

Figure 1:
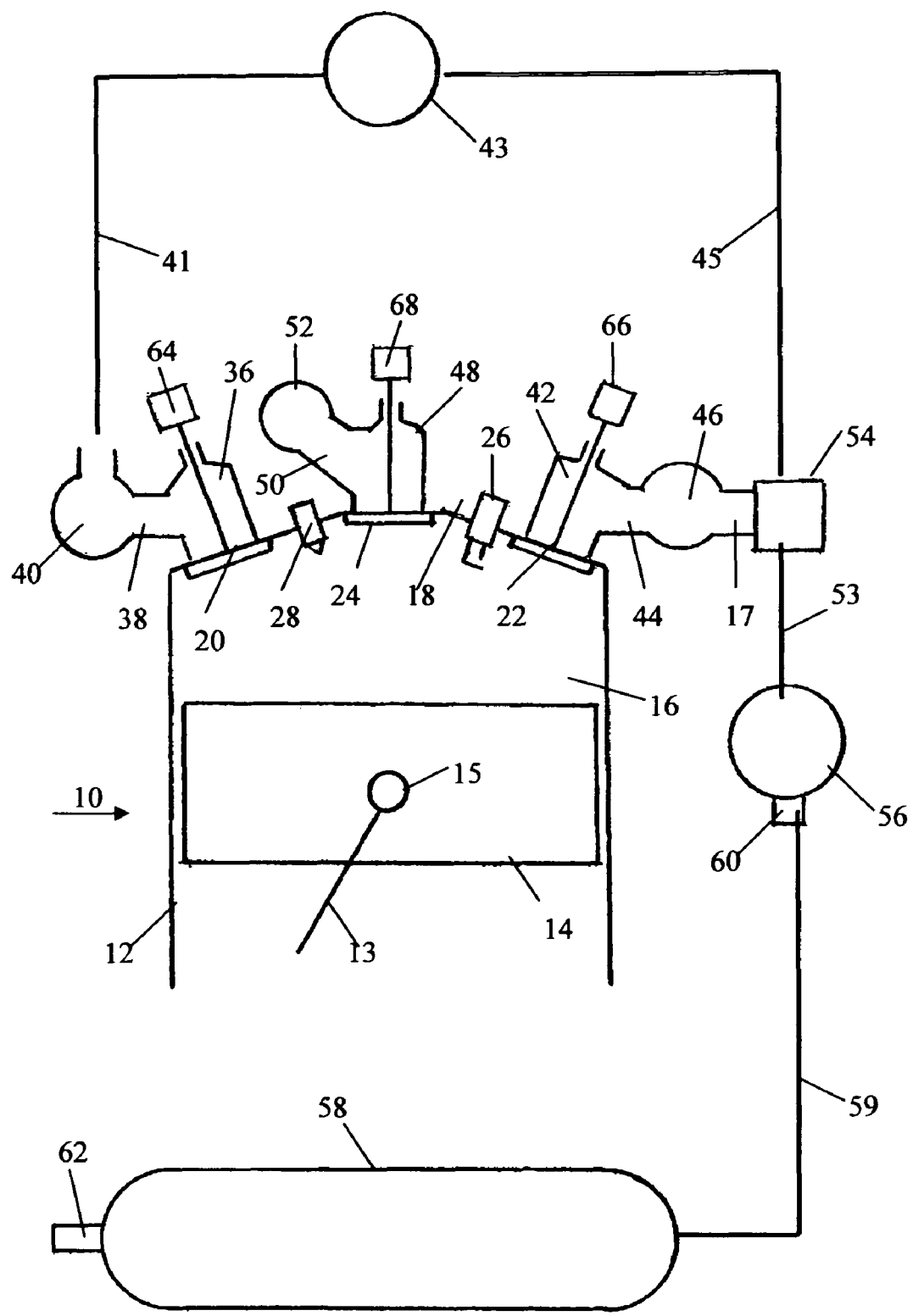
FIG. 1 is a schematic cross-sectional side-view of an engine cylinder and its connections to compressed-air reservoirs for single-stage operation, in accordance with the present invention.

FIG. 1 is a schematic, cross-sectional side-view of an engine cylinder and head arrangement and its connection to compressed-air reservoirs. An engine 10 has at least one such cylinder. A cylinder 12 contains a piston 14, which is mounted upon a connecting rod 13 by a wrist pin 15 and can reciprocate in cylinder 12, thus varying the volume of a cylinder chamber 16 enclosed between piston 14 and a cylinder head 18 attached to the top of cylinder 12.

Three types of normally-closed valves, a first air valve 20, a second air valve 22 and an exhaust valve 24 are installed in cylinder head 18. Actuators 64, 66 and 68 control operation of valves 20, 22 and 24, respectively. Various actuators, such as electrohydraulic, electromechanical, or electropneumatic actuators, can be used. In other cases, the valves can be controlled by camshafts. The valves can operate with variable timing of opening and closing, and they can be selectively deactivated. Depending on the needs of the engine, there may be more than one valve of each type in each engine cylinder. A conventional spark plug 26 and a fuel injector 28 are also mounted within cylinder head 18 and protrude into cylinder chamber 16. If engine 10 is a diesel, there is no need for spark ignition and spark plug 26 is omitted. In a port-injected engine, fuel injector 28 would be omitted too. Instead, a fuel injector would be installed in air passages leading to the cylinder.

First air valve 20 is shown in its closed position in which it separates cylinder chamber 16 from a first port 36, which opens into a first passage 38. First passage 38 connects to a first air manifold 40, to which all first ports and all first passages from all engine cylinders are connected. First air manifold 40 is connected to an intake system 43 via a duct 41. Intake system 43 is connected to outside atmosphere, usually through a system of intake pipes, an air-filter, etc.

Figure 26:
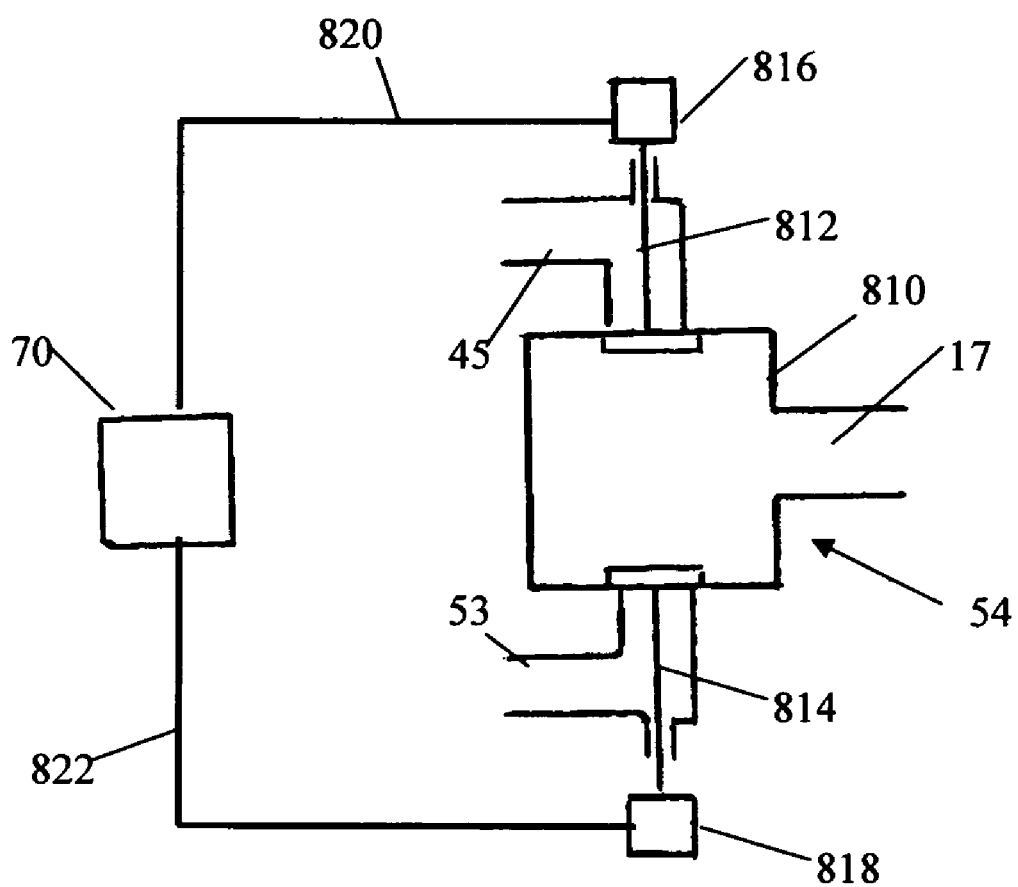
FIG. 26 is a schematic diagram illustrating a switching arrangement useable with the present invention.

Second air valve 22 is shown in its closed position in which it separates cylinder chamber 16 from a second port 42, which opens into a second passage 44. Second passage 44 connects to a second manifold 46, to which all second ports and all second passages from all engine cylinders are connected. Second air manifold 46 is connected, via duct 17, to a switching arrangement 54, which can be selectively connected either to intake system 43 via a duct 45 or to a short-term storage reservoir 56 via a duct 53. A description of switching arrangement 54 is given in a later text, and it is illustrated in FIG. 26. Short-term storage reservoir 56 can be connected to a long-term storage reservoir 58 via a connecting valve 60 and a duct 59. Long-term storage reservoir is equipped with a charging port 62, through which it can be connected to a source of compressed air.

Exhaust valve 24 is shown in its closed position in which it separates cylinder chamber 16 from an exhaust port 48, which opens into an exhaust passage 50. Exhaust passage 50 connects to an exhaust manifold 52, to which all exhaust ports and all exhaust passages from all engine cylinders are connected. Exhaust manifold 52 is connected to outside atmosphere, usually through a system of exhaust pipes, a muffler, a catalyst, etc. In this example of the preferred embodiment there is only one first air manifold, one second air manifold and one exhaust manifold. In other cases, however, the engine may have more than one of each type of air manifolds and more than one exhaust manifold.

The vehicle is equipped with a control system, which is an on-board computer that receives input signals from variety of sensors installed in the vehicle and on the engine. The signals generated by the sensors inform the control system about vehicle driver's demands for specific vehicle propulsion or braking force, as the case may be. Propulsion force is force acting on the vehicle in a direction of its motion. Braking force is force acting on the vehicle in a direction opposite to its motion. The input signals also carry information on physical and operational conditions in various parts and components of the engine and the vehicle. The control system evaluates the received information and, in accordance with its internal logic, controls operation of the engine and other vehicle components, so as to satisfy the driver's demands while maintaining optimum fuel consumption efficiency.

Figure 2:
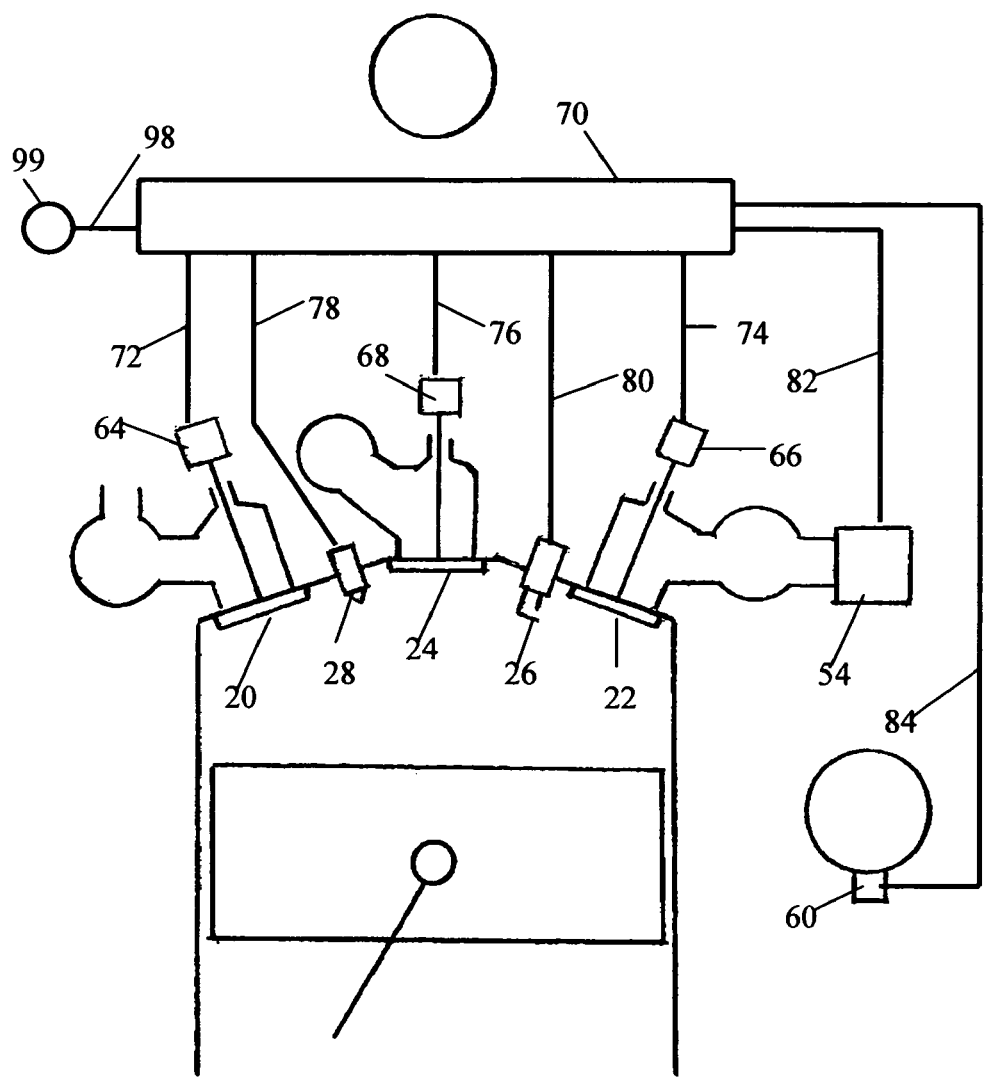
FIG. 2 is a schematic diagram illustrating electric connections of the control system to key controlling components of the engine shown in FIG. 1.
Figure 2:
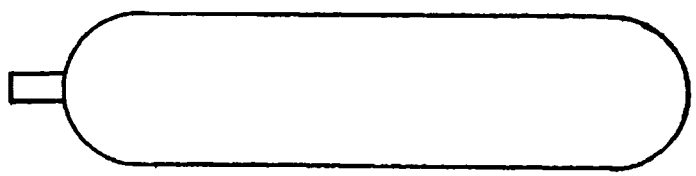

FIG. 2 illustrates electric connections of the control system to key controlling components of the vehicle, the engine and the air-reservoir system. A control system 70 controls operation of valves 20, 22 and 24 by sending control signals to actuators 64, 66 and 68, respectively, via electric wires 72, 74 and 76, respectively. It sends control signals to fuel injector 28 and spark plug 26 via electric wires 78 and 80, respectively. It also controls switching arrangement 54 and connecting valve 60 via electric wires 82 and 84, respectively. Control system 70 can also control operation of a friction brake system 99 by sending a control signal via an electric wire 98.

Two-Stage Compression System

Figure 3:
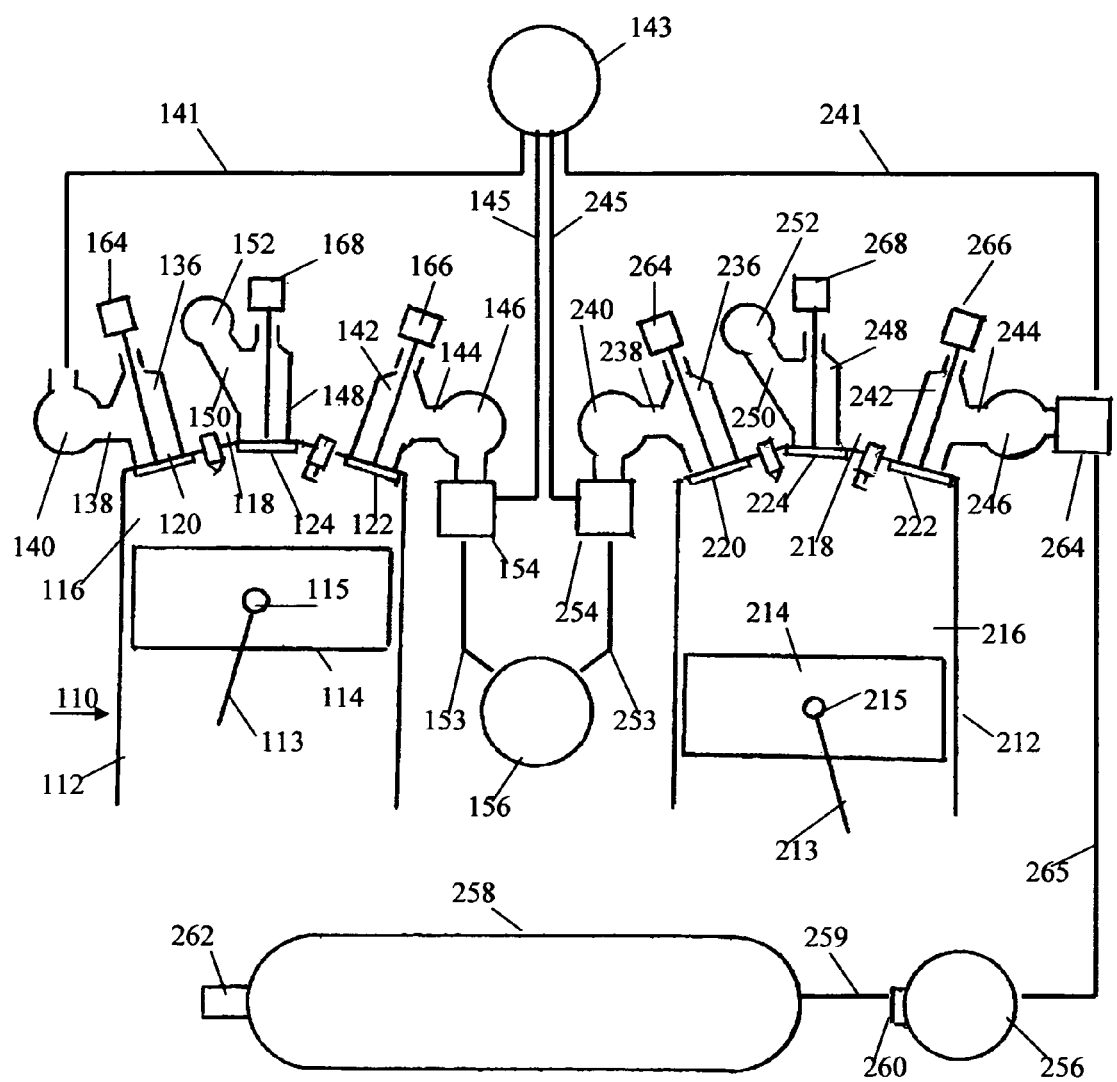
FIG. 3 is a schematic cross-sectional side-view of two engine cylinders and their connections to compressed-air reservoirs for two-stage operation, in accordance with the present invention.

FIG. 3 is a schematic, cross-sectional side-view of engine cylinders and head arrangement and their connection to compressed-air reservoirs. An engine 110 has at least two cylinders. There are two types of cylinders: primary cylinders and secondary cylinders.

1. Primary Cylinder.

A primary cylinder 112 contains a piston 114, which is mounted upon a connecting rod 113 by a wrist pin 115 and can reciprocate in cylinder 112, thus varying the volume of a cylinder chamber 116 enclosed between piston 114 and a cylinder head 118 attached to the top of primary cylinder 112.

Three types of normally-closed valves, a first primary air valve 120, a second primary air valve 122 and a primary exhaust valve 124 are installed in cylinder head 118. Actuators 164, 166 and 168 control operation of valves 120,122 and 124, respectively. Depending on the needs of the engine, there may be more than one valve of each type in each engine cylinder. A conventional spark plug and a fuel injector (both labeled in FIG. 4) are also mounted within cylinder head 118 and protrude into cylinder chamber 116. If engine 110 is a diesel, there is no need for spark ignition and the spark plug is omitted. In a port-injected engine, the fuel injector would be omitted too. Instead, a fuel injector would be installed in air passages leading to the cylinder.

First primary air valve 120 is shown in its closed position in which it separates cylinder chamber 116 from a first primary port 136, which opens into a first primary passage 138. First primary passage 138 connects to a first primary air manifold 140, to which all first primary ports and all first primary passages from all engine primary cylinders are connected. First primary air manifold 140 is connected to an intake system 143 via a duct 141. Intake system 143 is connected to outside atmosphere, usually through a system of intake pipes, an air-filter, etc.

Second primary air valve 122 is shown in its closed position, in which it separates cylinder chamber 116 from a second primary port 142, which opens into a second primary passage 144. Second primary passage 144 connects to a second primary manifold 146, to which all second primary ports and all second primary passages from all primary engine cylinders are connected. Second primary air manifold 146 is connected to a switching arrangement 154, which can be selectively connected either to intake system 143 via a duct 145 or to a first short-term storage reservoir 156 via a duct 153.

Exhaust valve 124 is shown in its closed position, in which it separates cylinder chamber 116 from a primary exhaust port 148 which opens into a primary exhaust passage 150. Primary exhaust passage 150 connects to a primary exhaust manifold 152, to which all primary exhaust ports and all primary exhaust passages from all primary cylinders are connected. Exhaust manifold 152 is connected to outside atmosphere, usually through a system of exhaust pipes, a muffler, a catalyst, etc. In this example of the preferred embodiment there is only one first primary air manifold, one second primary air manifold and one primary exhaust manifold. In other cases, however, the engine may have more than one of each type of primary air manifolds and more than one primary exhaust manifold.

2. Secondary Cylinder.

A secondary cylinder 212 contains a piston 214, which is mounted upon a connecting rod 213 by a wrist pin 215 and can reciprocate in cylinder 212, thus varying the volume of a cylinder chamber 216 enclosed between piston 214 and a cylinder head 218 attached to the top of secondary cylinder 212.

Three types of normally-closed valves, a first secondary air valve 220, a second secondary air valve 222 and a secondary exhaust valve 224 are installed in cylinder head 218. Actuators 264, 266 and 268 control operation of valves 220, 222 and 224, respectively. Depending on the needs of the engine, there may be more than one valve of each type in each secondary cylinder. A conventional spark plug and a fuel injector (both labeled in FIG. 4) are also mounted within cylinder head 218 and protrude into cylinder chamber 216. If engine 110 is a diesel, there is no need for spark ignition and the spark plug is omitted. In a port-injected engine, the fuel injector would be omitted too. Instead, a fuel injector would be installed in air passages leading to the cylinder.

First secondary air valve 220 is shown in its closed position in which it separates cylinder chamber 216 from a first secondary port 236, which opens into a first secondary passage 238. First secondary passage 238 connects to a first secondary air manifold 240, to which all first secondary ports and all first secondary passages from all secondary cylinders are connected. First secondary air manifold 240 is connected to a switching arrangement 254, which can be selectively connected either to intake system 143 via a duct 245 or to a first short-term storage reservoir 156 via a duct 253.

Second secondary air valve 222 is shown in its closed position, in which it separates cylinder chamber 216 from a second secondary port 242, which opens into a second secondary passage 244. Second secondary passage 244 connects to a second secondary manifold 246, to which all second secondary ports and all second secondary passages from all secondary cylinders are connected. Second secondary air manifold 246 is connected to a switching arrangement 264, which can be selectively connected either to intake system 143 via a duct 241 or to a second short-term storage reservoir 256 via a duct 265. Second short-term storage reservoir 256 can be connected to a long-term storage reservoir 258 via a connecting valve 260 and a duct 259. Long-term storage reservoir 258 is equipped with a charging port 262, through which it can be connected to a source of compressed air.

Exhaust valve 224 is shown in its closed position, in which it separates cylinder chamber 216 from a secondary exhaust port 248 which opens into a secondary exhaust passage 250. Secondary exhaust passage 250 connects to a secondary exhaust manifold 252 to which all secondary exhaust ports and all secondary exhaust passages from all secondary cylinders are connected. Exhaust manifold 252 is connected to outside atmosphere, usually through a system of exhaust pipes, a muffler, a catalyst, etc. In this example of the preferred embodiment there is only one first secondary air manifold, one second secondary air manifold and one secondary exhaust manifold. In other cases, however, the engine may have more than one of each type of secondary air manifolds and more than one secondary exhaust manifold.

The vehicle is equipped with a control system, which is an on-board computer that receives input signals from variety of sensors installed in the vehicle and on the engine. The signals generated by the sensors inform the control system about vehicle driver's demands for specific vehicle propulsion or braking force, as the case may be. Propulsion force is force acting on the vehicle in a direction of its motion. Braking force is force acting on the vehicle in a direction opposite to its motion. The input signals also carry information on physical and operational conditions in various parts and components of the engine and the vehicle. The control system evaluates the received information and, in accordance with its internal logic, controls operation of the engine and other vehicle components, so as to satisfy the driver's demands while maintaining optimum fuel consumption efficiency.

Figure 4:
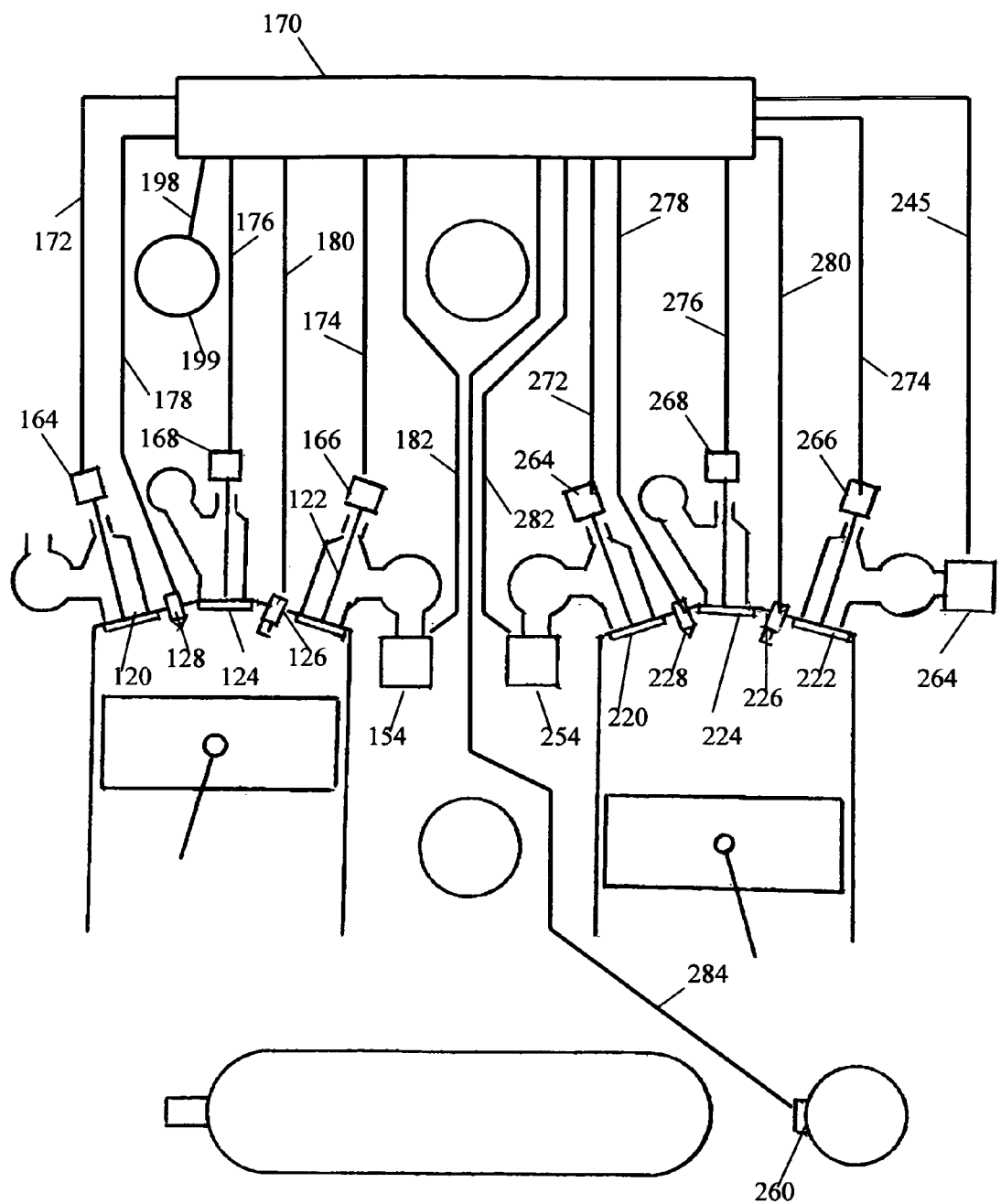
FIG. 4 is a schematic diagram illustrating electric connections of the control system to key controlling components of the engine shown in FIG. 3.

FIG. 4 illustrates electric connections of the control system to key controlling components of the engine and the air-reservoir system. A control system 170 controls operation of valves 120, 122, 124, 220, 222 and 224 by sending control signals to actuators 164, 166, 168, 264, 266 and 268, respectively, via electric wires 172, 174, 176, 272, 274 and 276, respectively. It sends control signals to fuel injectors 128 and 228, and to spark plugs 126 and 226 via electric wires 178, 278, 180, and 280 respectively. It also controls switching arrangements 154, 254 and 264 and connecting valve 260 via electric wires 182, 282, 245 and 284, respectively. Control system 170 can also control operation of a friction brake system 199 by sending a control signal via an electric wire 198.

Switching Arrangement

FIG. 26 illustrates, in principle, a typical two-way switching arrangement that can be used in the present embodiment. A housing 810 contains two valves, 812 and 814, which can be operated by actuators 816 and 818, respectively. In the drawing, both valves are shown in closed position. Various electrical, pneumatic, or hydraulic devices can be used as the above actuators. Control system 70 can selectively open or close the two valves, 812 and 814, by sending control signals to actuators 816 and 818, respectively, via electric lines 820 and 822, respectively. The lines 820 and 822 are part of electric wire 82 in FIG. 2. The switching arrangement can be in one or another of two positions: In one, valve 812 is open while valve 814 is closed. In this position, passage 17 (FIG. 1) is connected to duct 45 (FIG. 1). In the second position, valve 814 is open while valve 812 is closed. In that position, passage 17 is connected to duct 53 (FIG. 1).

The above switching arrangement was described as applied to the case of switching arrangement 54 (FIG. 1), but it can also be used in the case of switching arrangement 154 (FIG. 3) and in other cases.

Figure 23:
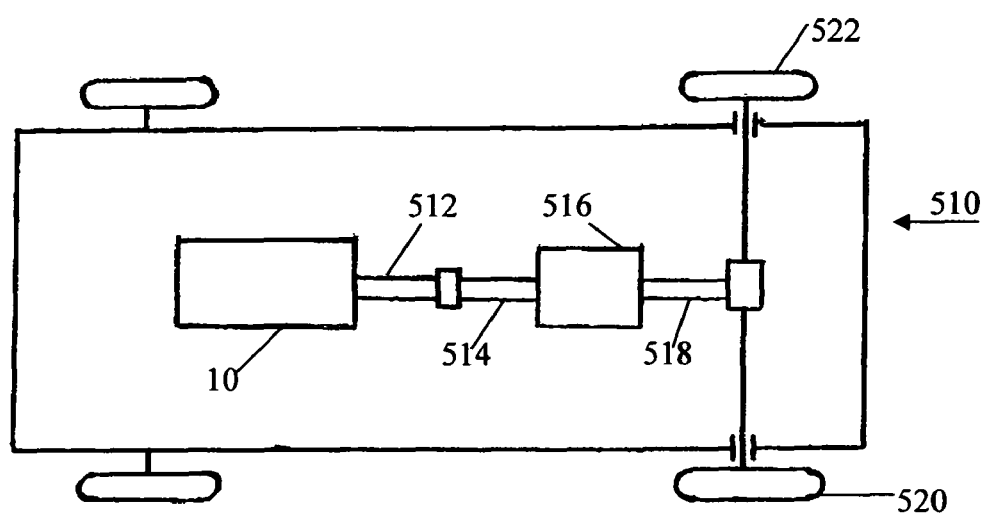
FIG. 23 is a schematic diagram illustrating how the engine can be coupled to the vehicle driving wheels.

Engine 10 is installed in a vehicle and is coupled to at least one of its wheels for its propulsion and braking. FIG. 23 is a schematic diagram showing an example of how the engine can be coupled to the transmission and connected to the vehicle driving wheels. Engine 10 is mounted in a vehicle 510. Engine crankshaft 512 is coupled to transmission input shaft 514, which drives the gears inside transmission 516. Transmission output shaft 518 is mechanically connected to vehicle driving wheels 520 and 522. Identical arrangement is used for engine 110 installation.

Those skilled in art will appreciate in view of this disclosure that other engine valves arrangements, other arrangements for supplying the control system with necessary information, and other methods of actuation of the key components of the system, possibly including other types of sensors and actuators, and other means of signal transmission, may be used according to the present invention. There may also be various alternative valve arrangements and alternative methods of gas exchange in the engine.

Description of Operation

FIGS. 3, 5 to 22, 24 and 25

The system of the present invention can operate alternatively in variety of air-hybrid modes, and it can also operate as a conventional internal combustion engine. The two most basic air-hybrid modes are compression-braking mode and air-expansion mode. Some typical modes of operation are described and illustrated below. For the sake of clarity of description, only the ducts, through which the air flows, are shown in the drawings.

Operation with Single-Stage Compression and Expansion

1. Compression braking.

Vehicle braking is performed whenever the vehicle driver signals a demand for a braking force by pressing on the brake pedal. It can be used to slow down the motion of the vehicle or to restrict its speed in a downhill drive. Compression braking is a preferred type of braking and is used whenever possible. Friction brakes are used only when needed to supplement compression braking, or when compression braking can not be used. Compression braking can be used only when the engine is coupled to the vehicle wheels and the vehicle is in motion.

In a moving vehicle with the engine coupled to the vehicle wheels, control system 70 (FIG. 2) responds to the driver's demand for a vehicle braking force by operating the engine in the compression-braking mode. If the vehicle is not in motion, or if the engine is not coupled to the wheels, control system 70 responds to the driver's demand for a vehicle braking force by activating friction brake system 99 (FIG. 2).

Figure 5:
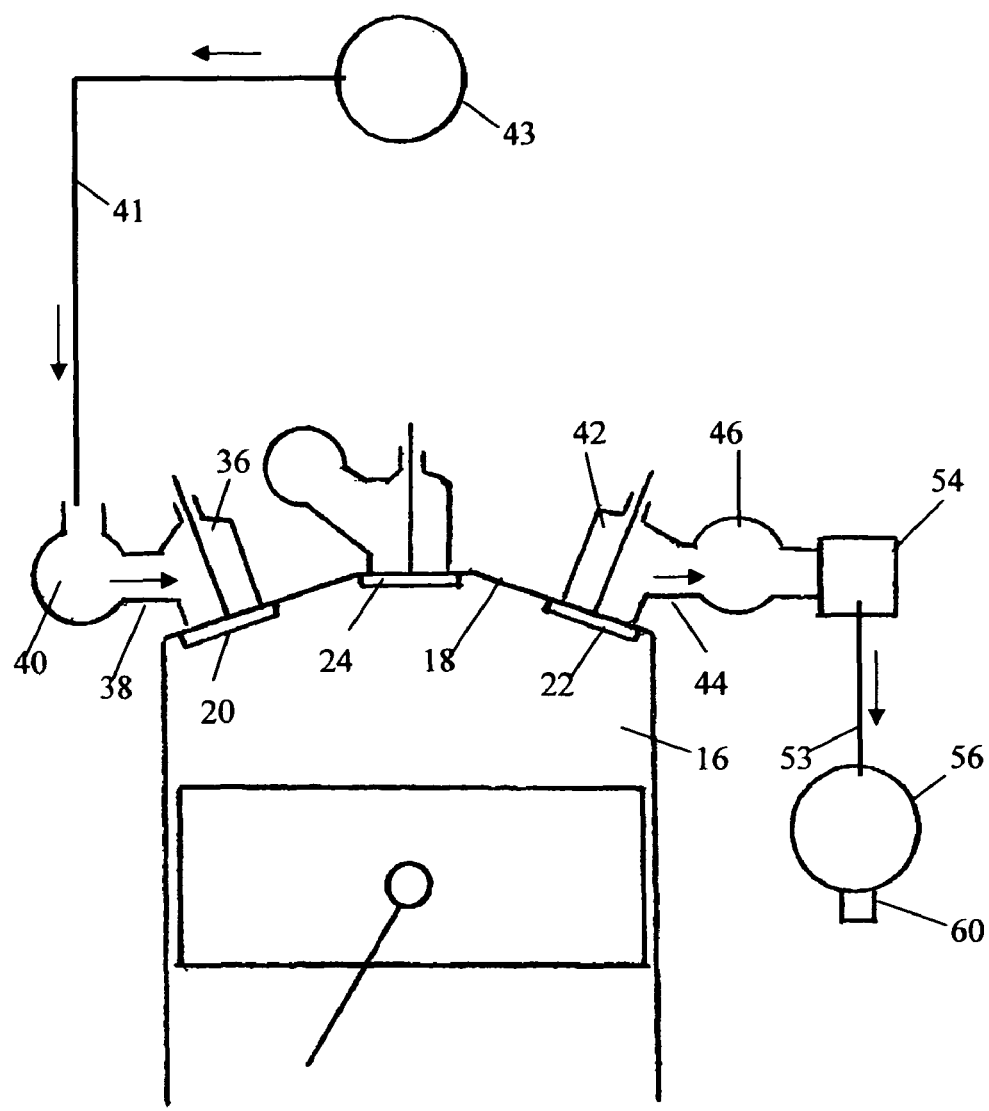
FIG. 5 illustrates the pattern of the air flow in the engine system shown in FIG. 1 during operation in a single-stage compression-braking mode.
Figure 5:
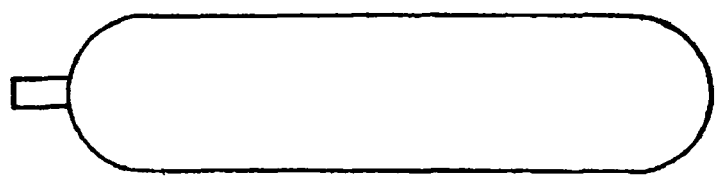

FIG. 5 illustrates the pattern of the air flow during operation in a single-stage compression braking mode. During compression braking, no fuel is supplied into the engine cylinders, and the engine operates as a reciprocating-piston single-stage compressor driven from the vehicle wheels by vehicle motion. Air is received from outside atmosphere into the engine cylinders, compressed there, and displaced into short-term storage reservoir 56. Exhaust valve 24 is deactivated and switching arrangement 54 connects second air manifold 46 to short term storage reservoir 56. Connecting valve 60 is closed.

During piston 14 volume-increasing stroke, when piston 14 moves away from head 18, atmospheric air enters cylinder chamber 16. The air flows from intake system 43 through duct 41, first air manifold 40, first passage 38, first port 36 and first air valve 20 into cylinder chamber 16. During piston 14 volume-decreasing stroke, when piston 14 moves towards head 18, air is compressed in cylinder chamber 16 and then displaced into short-term storage reservoir 56. The air flows from cylinder chamber 16 through second air valve 22, second port 42, second passage 44, second air manifold 46, switching arrangement 54 and duct 53 into short-term storage reservoir 56. The direction of the air flow is shown in FIG. 5 by arrows. Control system 70 (FIG. 2) controls operation of air valves 20 and 22, and of switching arrangement 54 in accordance with a program incorporated in its software.

2. Air-Expansion Mode.

Air-expansion mode is used to reduce the vehicle fuel consumption by supplementing the chemical energy of fuel with energy of compressed air stored in the short-term and long-term reservoirs. It is performed in response to a demand for a vehicle propulsion force as long as there is sufficient air pressure in the reservoirs. After each compression braking, the short-term reservoir is filled with compressed air, and that air is used to accelerate and propel the vehicle after the braking. Compressed air from the long-term reservoir is used only when energy of compressed air from the short-term reservoir is not available. In practical terms, this means that whenever pressure in the short-term reservoir drops below a certain predetermined low level, the engine is switched to using compressed air from the long-term reservoir. When pressure in both the short-term and the long-term reservoirs drops below a predetermined low level, the engine operation is switched to a conventional internal-combustion cycle. There can be different variants of the air-expansion mode, and some of them are described below.

Figure 6:
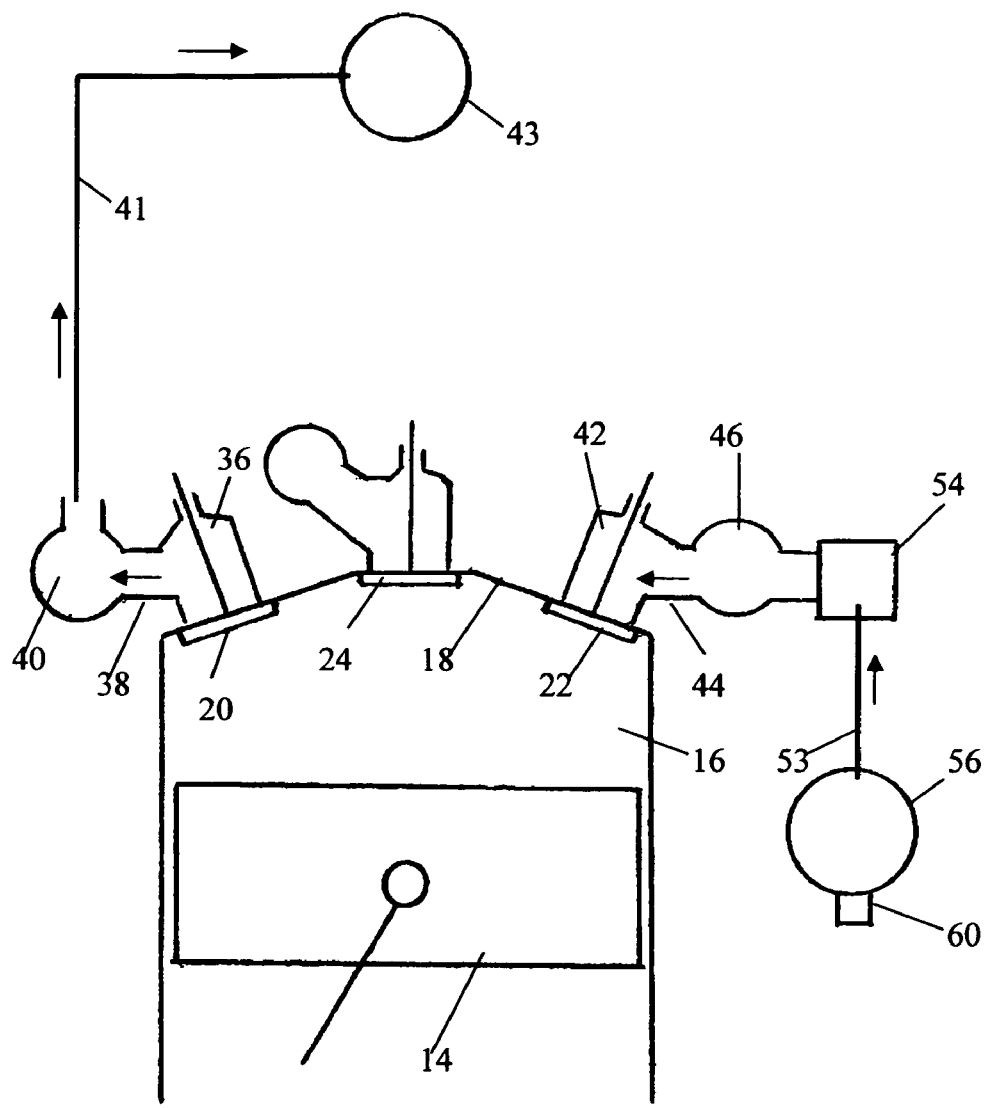
FIG. 6 illustrates the pattern of the air flow in the engine system shown in FIG. 1 during operation in a single-stage air-motor mode using air from the short-term storage reservoir.
Figure 6:

AIR-MOTOR OPERATION—During air-motor operation, no fuel is supplied into the engine cylinders, and the engine operates as a reciprocating-piston single-stage air motor driven by compressed air from the short-term and long-term storage reservoirs. Compressed air is received from the reservoirs into the engine cylinders, expanded there, and displaced into outside atmosphere. Work performed by compressed air drives the vehicle FIG. 6 illustrates air-motor operation using compressed air from short-term storage reservoir 56. Exhaust valve 24 is deactivated and switching arrangement 54 connects second air manifold 46 to short-term storage reservoir 56. Connecting valve 60 is closed.

During piston 14 volume-increasing stroke, when piston 14 moves away from head 18, compressed air from short-term storage reservoir 56 enters cylinder chamber 16 and expands there. The air flows from reservoir 56 through duct 53, switching arrangement 54, second air manifold 46, second passage 44, second port 42 and second air valve 22 into cylinder chamber 16. During piston 14 volume-decreasing stroke, when piston 14 moves towards head 18, air is displaced into outside atmosphere. The air flows from cylinder chamber 16 through first air valve 20, first port 36, first passage 38, first air manifold 40, and duct 41 into intake system 43. The direction of the air flow is shown in FIG. 6 by arrows. Control system 70 (FIG. 2) controls operation of air valves 20 and 22, and of switching arrangement 54 in accordance with a program incorporated in its software.

Figure 7:
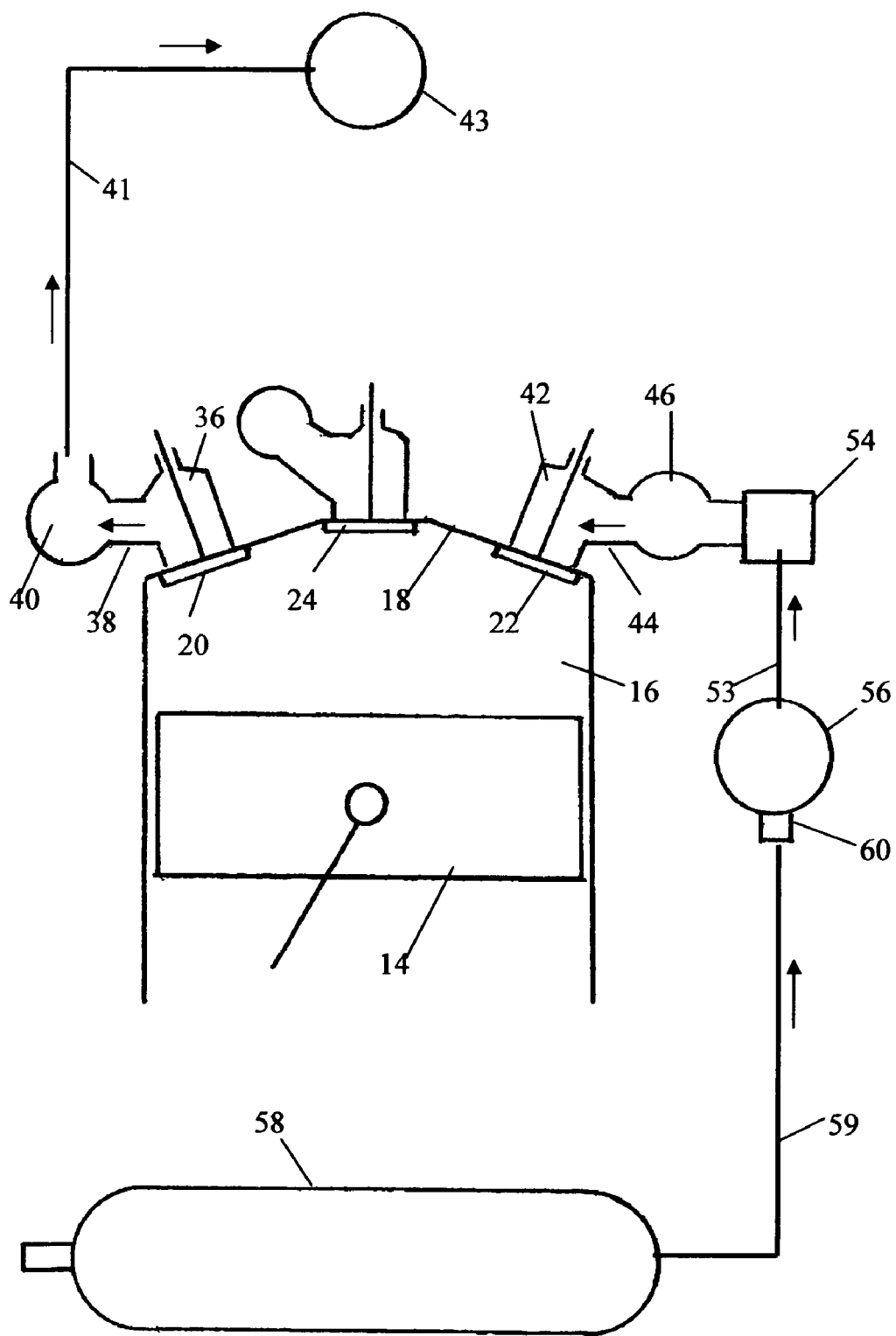
FIG. 7 illustrates the pattern of the air flow in the engine system shown in FIG. 1 during operation in a single-stage air-motor mode using air from the long-term storage reservoir.

FIG. 7 illustrates air-motor operation using compressed air from long-term storage reservoir 58. Exhaust valve 24 is deactivated and switching arrangement 54 connects second air manifold 46 to long-term storage reservoir 58. Connecting valve 60 is open, and short-term reservoir 56 is connected to long-term reservoir 58 via connecting valve 60 and duct 59.

During piston 14 volume-increasing stroke, when piston 14 moves away from head 18, compressed air from long-term storage reservoir 58 enters cylinder chamber 16 and expands there. The air flows from long-term reservoir 58 through duct 59 and valve 60 into reservoir 56 and from there through duct 53, switching arrangement 54, second air manifold 46, second passage 44, second port 42 and second air valve 22 into cylinder chamber 16. During piston 14 volume-decreasing stroke, when piston 14 moves towards head 18, air is displaced into outside atmosphere. The air flows from cylinder chamber 16 through first air valve 20, first port 36, first passage 38, first air manifold 40, and duct 41 into intake system 43. The direction of the air flow is shown in FIG. 7 by arrows. Control system 70 (FIG. 2) controls operation of air valves 20 and 22, and of switching arrangement 54 in accordance with a program incorporated in its software.

Figure 7A:
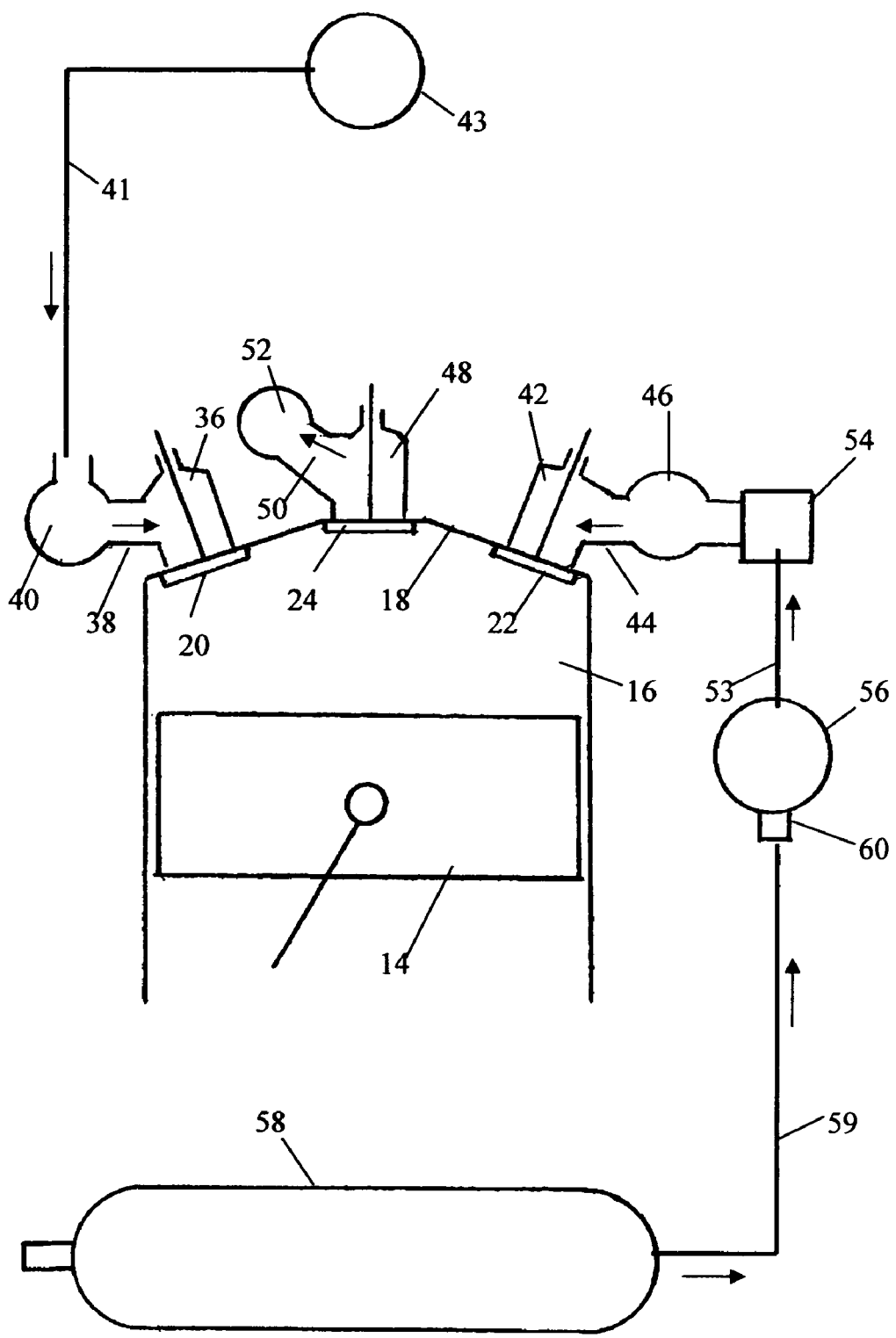
FIG. 7A illustrates the pattern of the air flow in the engine system shown in FIG. 1 during operation in a single-stage air-motor mode using air from the long-term storage reservoir and atmospheric air.

To prevent excessively low temperature in the engine cylinders after air expansion, it is, sometimes, desirable to mix the compressed air, flowing into the engine from the long-term storage reservoir, with certain amount of atmospheric air. For this, the cycle, in each cylinder, should include two volume-increasing piston strokes. Atmospheric air is received into the cylinder during a first volume-increasing stroke and is compressed during subsequent first volume decreasing stroke. Compressed air is received from the long-term storage reservoir into the cylinder during a second volume-increasing stroke. FIG. 7A illustrates such operation. The arrangement is the same as illustrated in FIG. 7, except exhaust valve 24 is operational. Atmospheric air flows from intake system 43 through duct 41, first intake manifold 40, first passage 38, first port 36 and first air valve 20 into cylinder chamber 16. During the first air-decreasing stroke, that air is compressed. The rest of the cycle is the same as described above and illustrated in FIG. 7, except for the final exhaust, which is through exhaust valve 24 into exhaust manifold 52.

In another variant of the above concept, both atmospheric air and compressed air are inducted into the cylinder sequentially during a single piston stroke, with atmospheric air induction preceding the induction of compressed air. This eliminates the need for additional piston stroke. In still another variant, atmospheric air is inducted during the volume-increasing stroke and the compressed air is inducted during subsequent volume-decreasing stroke. FIGS. 7A and 7 remain valid illustrations of the above variants of the concept.

AIR-POWER-ASSISTED OPERATION—During air-power-assisted operation, the engine operates both as an internal-combustion engine using fuel from the vehicle fuel tank and as an air motor using compressed air from the air-storage reservoirs in the same cycle. Compressed air is received from the reservoirs into the engine cylinders, expanded there and used for combustion in a conventional internal-combustion cycle. Fuel is added to the air either before or after it enters the cylinder.

Figure 8:
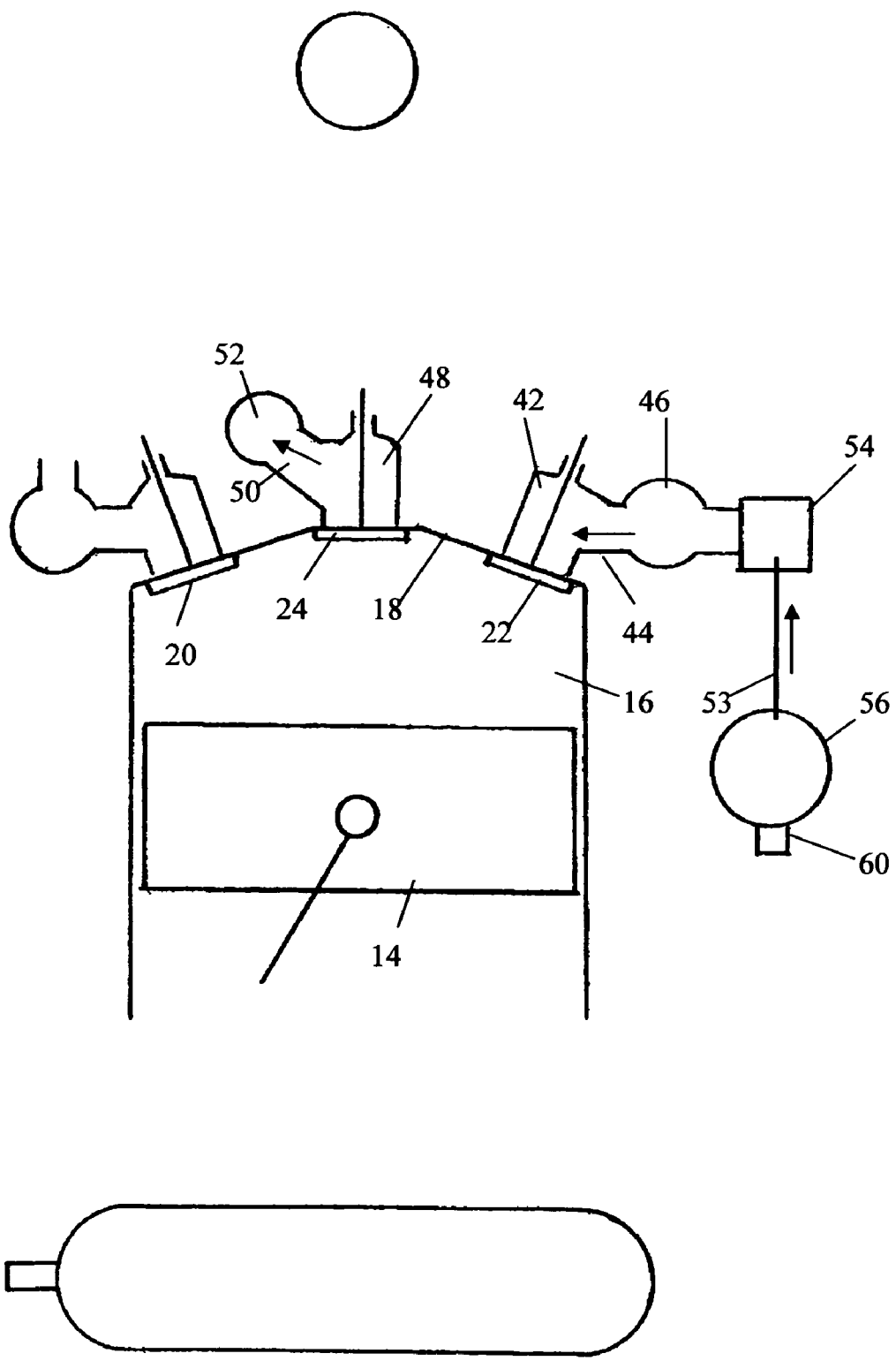
FIG. 8 illustrates the pattern of the air flow in the engine system shown in FIG. 1 during operation in a single-stage air-power-assist mode using air from the short-term storage reservoir.

FIG. 8 illustrates air-power-assisted operation using compressed air from short-term storage reservoir 56. First intake valve 20 is deactivated and switching arrangement 54 connects second air manifold 46 to short-term storage reservoir 56. Connecting valve 60 is closed.

During piston 14 volume-increasing stroke, when piston 14 moves away from head 18, compressed air from short-term storage reservoir 56 enters cylinder chamber 16 and expands there. The air flows from reservoir 56 through duct 53, switching arrangement 54, second air manifold 46, second passage 44, second port 42 and second air valve 22 into cylinder chamber 16. During the rest of the cycle, the expanded air is used to perform a conventional internal-combustion cycle. At the end of the combustion cycle, the exhaust gas is expelled into outside atmosphere. It flows from cylinder chamber 16 through exhaust valve 24 and exhaust passage 50 into exhaust manifold 52. The direction of the air flow is shown in FIG. 8 by arrows. Control system 70 controls operation of valves 22 and 24, and of switching arrangement 54 in accordance with a program incorporated in its software.

Figure 9:
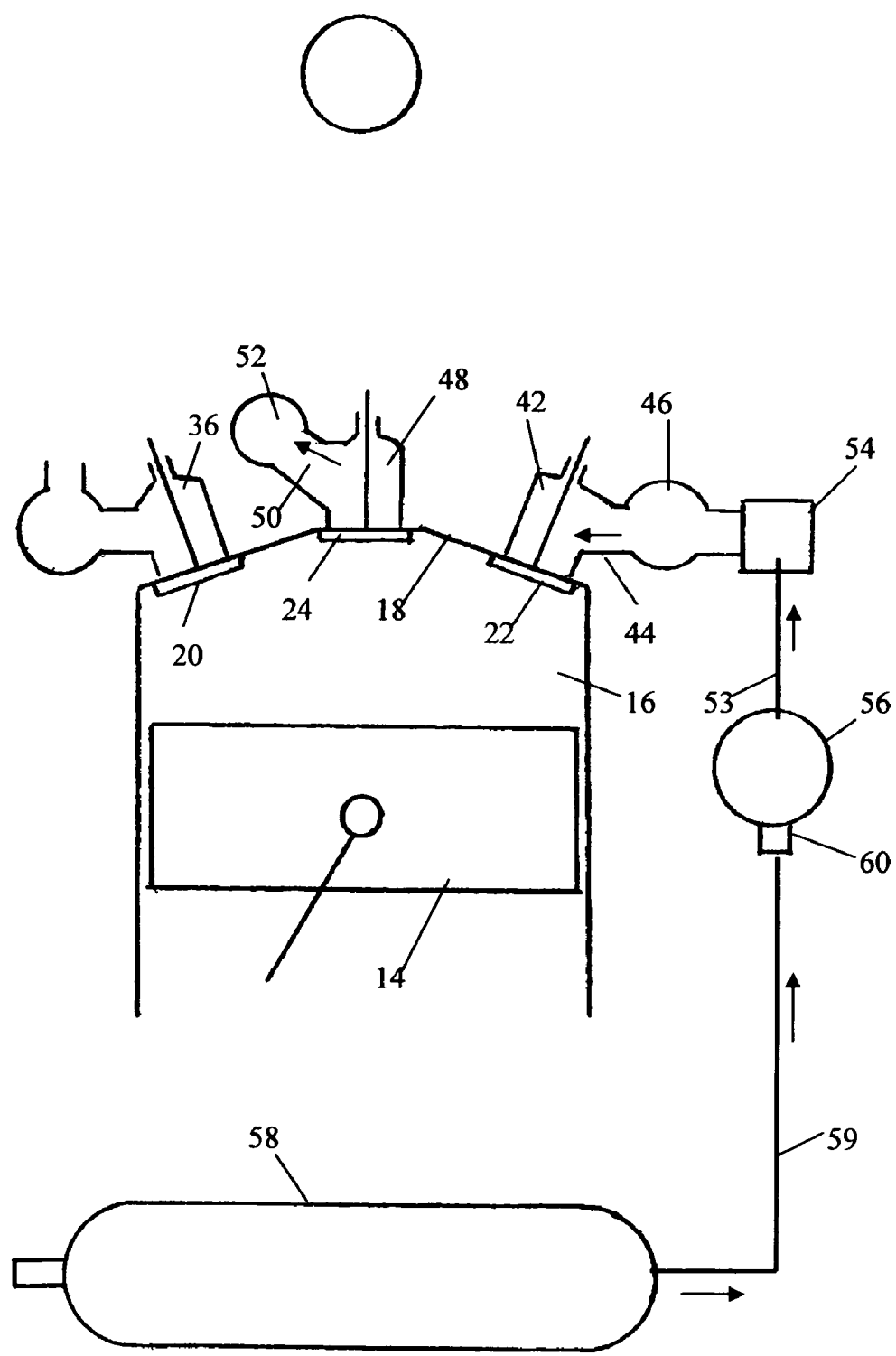
FIG. 9 illustrates the pattern of the air flow in the engine system shown in FIG. 1 during operation in a single-stage air-power-assist mode using air from the long-term storage reservoir.

FIG. 9 illustrates air-power-assisted operation using compressed air from long-term storage reservoir 58. First intake valve 20 is deactivated and switching arrangement 54 connects second air manifold 46 to short term storage reservoir 56. Connecting valve 60 is open, and short-term reservoir 56 is connected to long-term reservoir 58 via connecting valve 60 and duct 59.

During piston 14 volume-increasing stroke, when piston 14 moves away from head 18, compressed air from long-term storage reservoir 58 enters cylinder chamber 16 and expands there. The air flows from reservoir 58 through duct 59, connecting valve 60, short-term storage reservoir 56, duct 53, switching arrangement 54, second air manifold 46, second passage 44, second port 42 and second air valve 22 into cylinder chamber 16. During the rest of the cycle, the expanded air is used to perform a conventional internal-combustion cycle. At the end of the combustion cycle, the exhaust gas is expelled into outside atmosphere. It flows from cylinder chamber 16 through exhaust valve 24 and exhaust passage 50 into exhaust manifold 52. The direction of the air flow is shown in FIG. 9 by arrows. Control system 70 controls operation of valves 22 and 24, and of switching arrangement 54 in accordance with a program incorporated in its software.

To prevent excessively low temperature in the engine cylinders after air expansion, it is, sometimes, desirable to mix the compressed air, flowing into the engine from the long-term storage reservoir, with certain amount of atmospheric air. For this, the cycle, in each cylinder, should include three volume-increasing piston strokes. Atmospheric air is received into the cylinder during a first volume-increasing stroke and is compressed during subsequent first volume decreasing stroke. Compressed air is received from the long-term storage reservoir into the cylinder during a second volume-increasing stroke. FIG. 7A illustrates such operation. The arrangement is the same as illustrated in FIG. 9, except duct 41 is used. Atmospheric air flows from intake system 43 through duct 41, first intake manifold 40, first passage 38, first port 36 and first air valve 20 into cylinder chamber 16. During the first air-decreasing stroke, that air is compressed. The rest of the cycle is the same as described above and illustrated in FIG. 9.

In another variant of the above concept, both atmospheric air and compressed air are inducted into the cylinder sequentially during a single piston stroke, with atmospheric air induction preceding the induction of compressed air. This eliminates the need for additional piston stroke. In still another variant, atmospheric air is inducted during the volume-increasing stroke and the compressed air is inducted during subsequent volume-decreasing stroke. FIGS. 7A and 9 remain valid illustrations of the above variants of the concept.

3. Conventional Internal-Combustion Mode.

Figure 10:
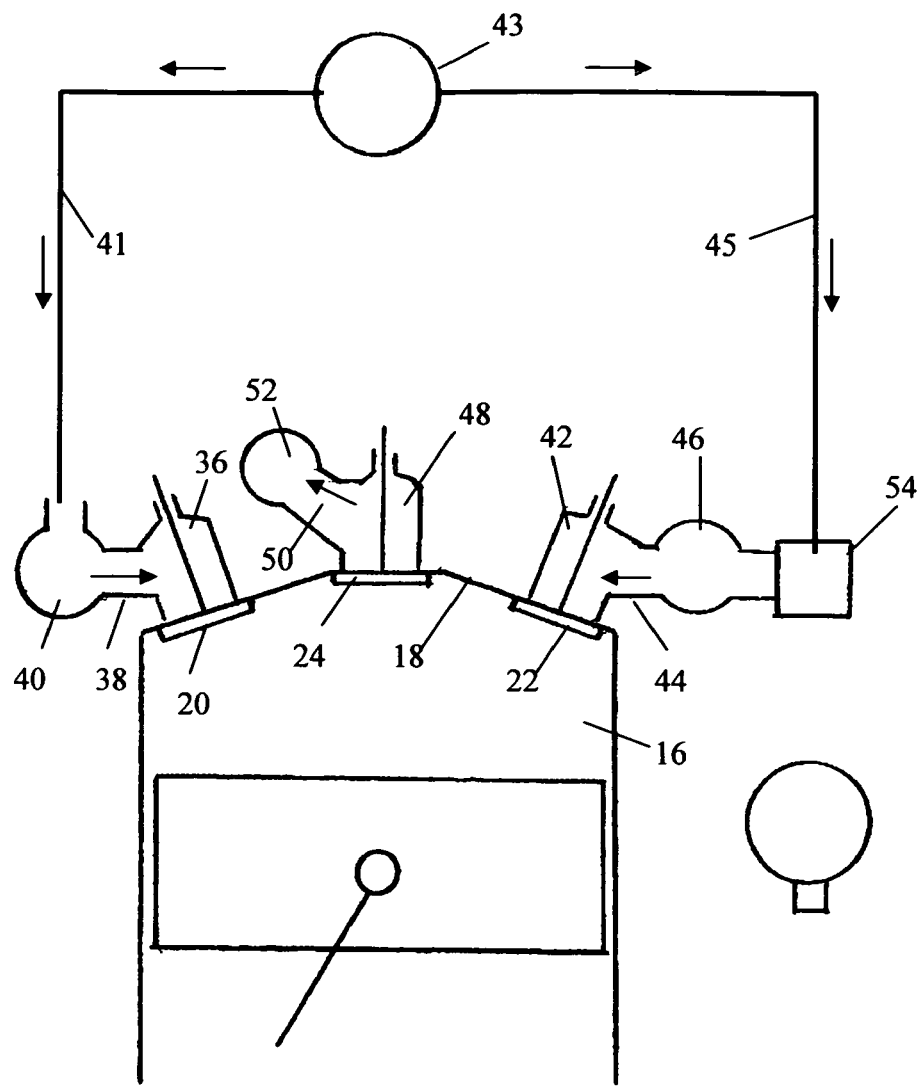
FIG. 10 illustrates the pattern of the air flow in the engine system shown in FIG. 1 during operation as a conventional internal-combustion engine.

To switch from any air-hybrid mode to conventional internal combustion, switching arrangement 54 (FIG. 10) connects second air manifold 46 to intake system 43. The engine operates as a conventional internal-combustion engine receiving air only from outside atmosphere. FIG. 10 illustrates the air and gas flow in this mode. Atmospheric air flows from intake system 43 into cylinder chamber 16 through duct 41, first air manifold 40, first passage 38, first port 36 and first air valve 20; and through duct 45, switching arrangement 54, second air manifold 46, second passage 44, second port 42 and second air valve 22. Exhaust gas is expelled from cylinder chamber 16 into exhaust manifold 52 through exhaust valve 24 and exhaust passage 50.

Operation with Two-Stage Compression and Expansion

1. Compression Braking.

Figure 11:
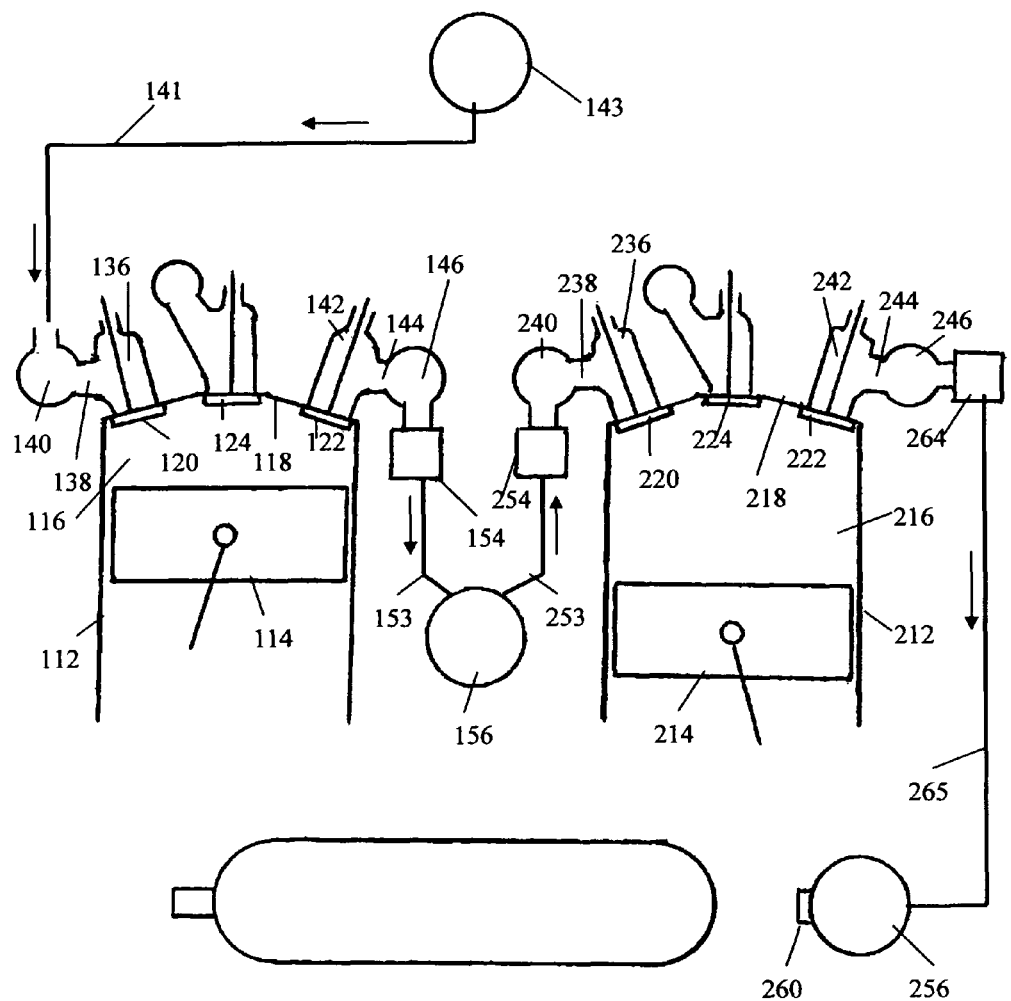
FIG. 11 illustrates the pattern of the air flow in the engine system shown in FIG. 3 during operation in a two-stage compression-braking mode.

FIG. 11 illustrates the pattern of the air flow during operation in a two-stage compression braking mode. During two-stage compression braking, no fuel is supplied into the engine cylinders, and the engine operates as a reciprocating-piston two-stage compressor driven from the vehicle wheels by vehicle motion. Air is received from outside atmosphere into the engine cylinders, compressed there, and displaced into second short-term storage reservoir 256 (FIG. 11). Exhaust valves 124 and 224 are deactivated, switching arrangement 154 connects second primary air manifold 146 to first short-term storage reservoir 156, switching arrangement 254 connects first secondary air manifold 240 to first short-term storage reservoir 156 and switching arrangement 264 connects second secondary air manifold 246 to second short-term storage reservoir 256. Connecting valve 260 is closed.

In primary cylinder 112, during piston 114 volume-increasing stroke, when piston 114 moves away from head 118, atmospheric air enters cylinder chamber 116. The air flows from intake system 143 through duct 141, first primary air manifold 140, first primary passage 138, first primary port 136 and first primary air valve 120 into cylinder chamber 116. During piston 114 volume-decreasing stroke, when piston 114 moves towards head 118, air is compressed in cylinder chamber 116 and then displaced into first short-term storage reservoir 156. The air flows from cylinder chamber 116 through second primary air valve 122, second primary port 142, second primary passage 144, second primary air manifold 146, switching arrangement 154 and duct 153 into first short-term storage reservoir 156.

In secondary cylinder 212, during piston 214 volume-increasing stroke, when piston 214 moves away from head 218, compressed air enters cylinder chamber 216. The air flows from first short-term storage reservoir 156 through duct 253, switching arrangement 254, first secondary air manifold 240, first secondary passage 238, first secondary port 236 and first secondary air valve 220 into cylinder chamber 216. During piston 214 volume-decreasing stroke, when piston 214 moves towards head 218, air is further compressed in cylinder chamber 216 and then displaced into second short-term storage reservoir 256. The air flows from cylinder chamber 216 through second secondary air valve 222, second secondary port 242, second secondary passage 244, second secondary air manifold 246, switching arrangement 264 and duct 265 into second short-term storage reservoir 256.

The direction of the air flow is shown in FIG. 11 by arrows. Control system 170 (FIG. 4) controls operation of air valves 120, 122, 220 and 222, and of switching arrangements 154, 254 and 264 in accordance with a program incorporated in its software.

2. Air-Expansion Mode.

Air-expansion mode is used to reduce the vehicle fuel consumption by supplementing the chemical energy of fuel with energy of compressed air stored in the short-term and long-term reservoirs. There can be different variants of the two-stage air-expansion mode, and some of them are described below.

AIR-MOTOR OPERATION—During air-motor operation, no fuel is supplied into the engine cylinders, and the engine operates as a reciprocating-piston two-stage air motor driven by compressed air from the short-term and long-term storage reservoirs. Compressed air is received from the reservoirs into the engine cylinders, expanded there, and displaced into outside atmosphere. Work performed by compressed air drives the vehicle.

Figure 12:
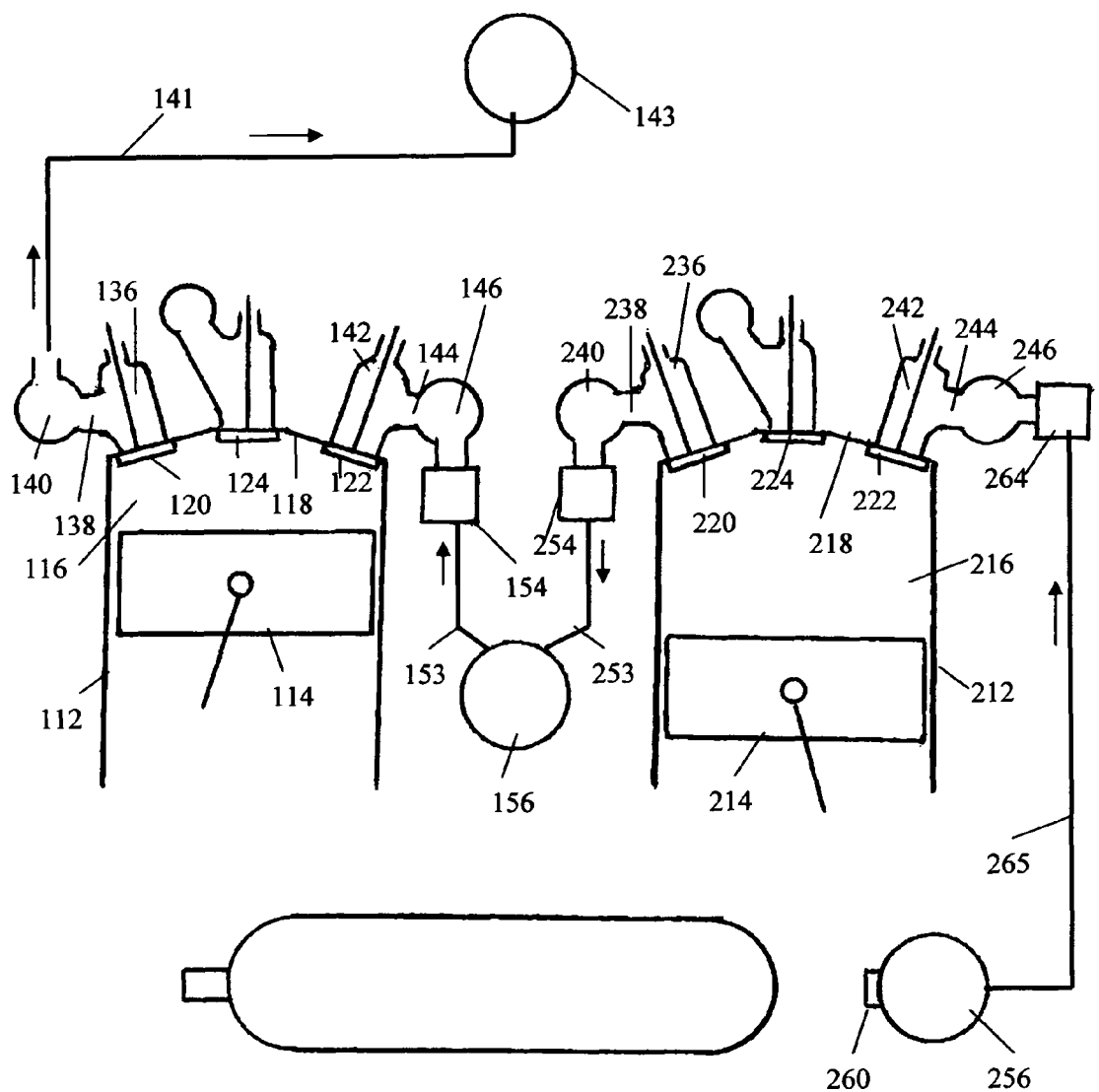
FIG. 12 illustrates the pattern of the air flow in the engine system shown in FIG. 3 during operation in a two-stage air-motor mode using air from the short-term storage reservoir.

FIG. 12 illustrates air-motor operation using compressed air from short-term storage reservoir 256. Exhaust valves 124 and 224 are deactivated, switching arrangement 154 connects second primary air manifold 146 to first short-term storage reservoir 156, switching arrangement 254 connects first secondary air manifold 240 to first short-term storage reservoir 156 and switching arrangement 264 connects second secondary air manifold 246 to second short-term storage reservoir 256. Connecting valve 260 is closed.

In secondary cylinder 212, during piston 214 volume-increasing stroke, when piston 214 moves away from head 218, compressed air enters cylinder chamber 216 and expands there. The air flows from second short-time storage reservoir 256 through duct 265, switching arrangement 264, second secondary air manifold 246, second secondary passage 244, second secondary port 242 and second secondary air valve 222 into cylinder chamber 216. During piston 214 volume-decreasing stroke, when piston 214 moves towards head 218, air is displaced from cylinder chamber 216 into first short-term storage reservoir 156. The air flows from cylinder chamber 216 through first secondary air valve 220, first secondary port 236, first secondary passage 238, first secondary air manifold 240, switching arrangement 254 and duct 253 into first short-term storage reservoir 156.

In primary cylinder 112, during piston 114 volume-increasing stroke, when piston 114 moves away from head 118, compressed air enters cylinder chamber 116 and further expands there. The air flows from first short-term storage reservoir 156 through duct 153, switching arrangement 154, second primary air manifold 146, second primary passage 144, second primary port 142 and second primary air valve 122 into cylinder chamber 116. During piston 114 volume-decreasing stroke, when piston 114 moves towards head 118, air is expelled from cylinder chamber 116 into outside atmosphere. The air flows from cylinder chamber 116 through first primary air valve 120, first primary port 136, first primary passage 138, first primary air manifold 140 and duct 141 into intake system 143.

Figure 13:
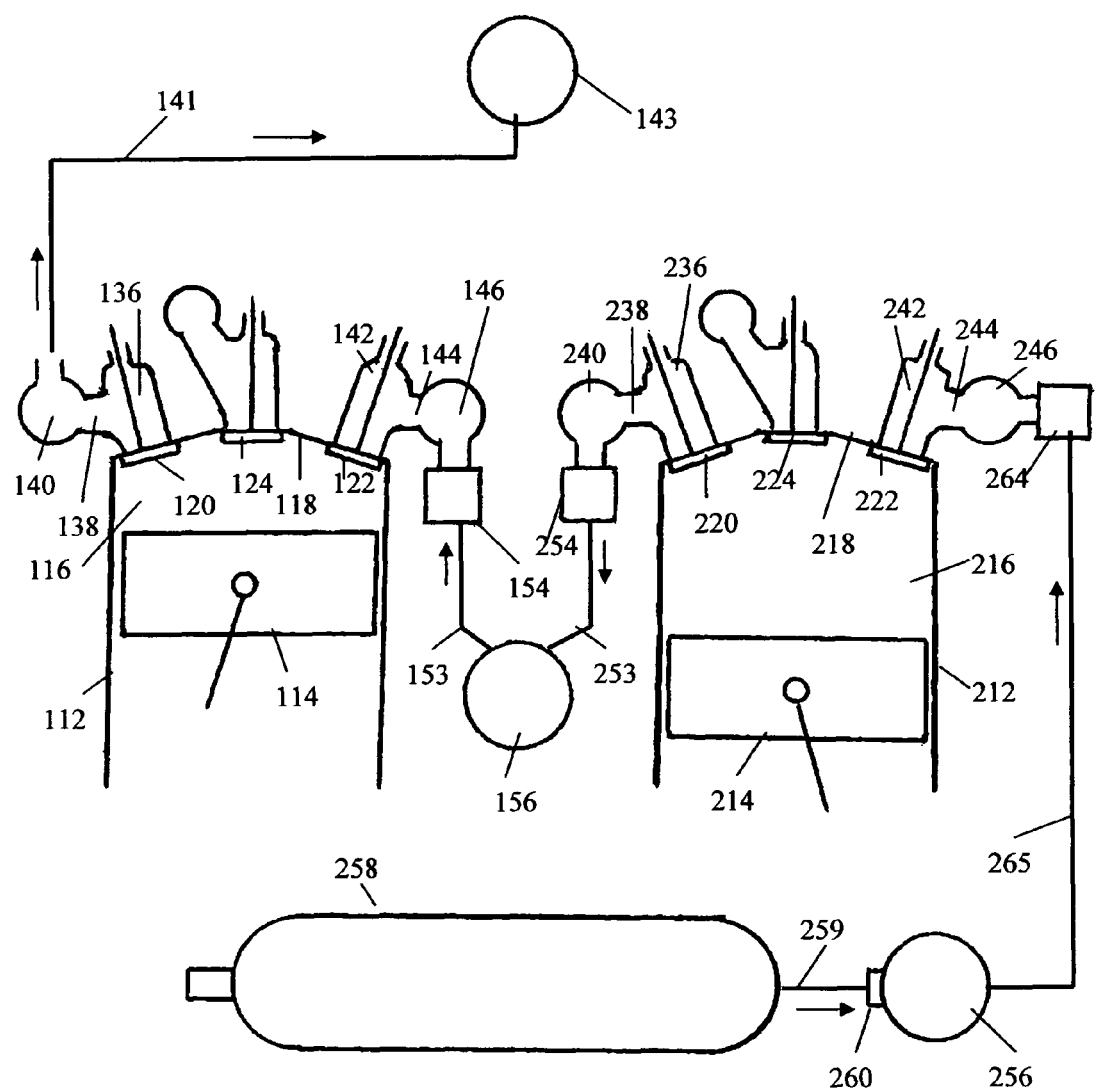
FIG. 13 illustrates the pattern of the air flow in the engine system shown in FIG. 3 during operation in a two-stage air-motor mode using air from the long-term storage reservoir.

FIG. 13 illustrates air-motor operation using compressed air from long-term storage reservoir 258. Exhaust valves 124 and 224 are deactivated, switching arrangement 154 connects second primary air manifold 146 to first short-term storage reservoir 156, switching arrangement 254 connects first secondary air manifold 240 to first short-term storage reservoir 156 and switching arrangement 264 connects second secondary air manifold 246 to second short-term storage reservoir 256. Connecting valve 260 is open, and long-term storage reservoir 258 is connected to reservoir 256 via duct 259 and valve 260.

In secondary cylinder 212, during piston 214 volume-increasing stroke, when piston 214 moves away from head 218, compressed air enters cylinder chamber 216 and expands there. The air flows from long-term storage reservoir 258 through duct 259 and valve 260 into second short-time storage reservoir 256 and from there through duct 265, switching arrangement 264, second secondary air manifold 246, second secondary passage 244, second secondary port 242 and second secondary air valve 222 into cylinder chamber 216. During piston 214 volume-decreasing stroke, when piston 214 moves towards head 218, air is displaced from cylinder chamber 216 into first short-term storage reservoir 156. The air flows from cylinder chamber 216 through first secondary air valve 220, first secondary port 236, first secondary passage 238, first secondary air manifold 240, switching arrangement 254 and duct 253 into first short-term storage reservoir 156.

In primary cylinder 112, during piston 114 volume-increasing stroke, when piston 114 moves away from head 118, compressed air enters cylinder chamber 116 and further expands there. The air flows from first short-term storage reservoir 156 through duct 153, switching arrangement 154, second primary air manifold 146, second primary passage 144, second primary port 142 and second primary air valve 122 into cylinder chamber 116. During piston 114 volume-decreasing stroke, when piston 114 moves towards head 118, air is expelled from cylinder chamber 116 into outside atmosphere. The air flows from cylinder chamber 116 through first primary air valve 120, first primary port 136, first primary passage 138, first primary air manifold 140 and duct 141 into intake system 143.

Figure 13A:
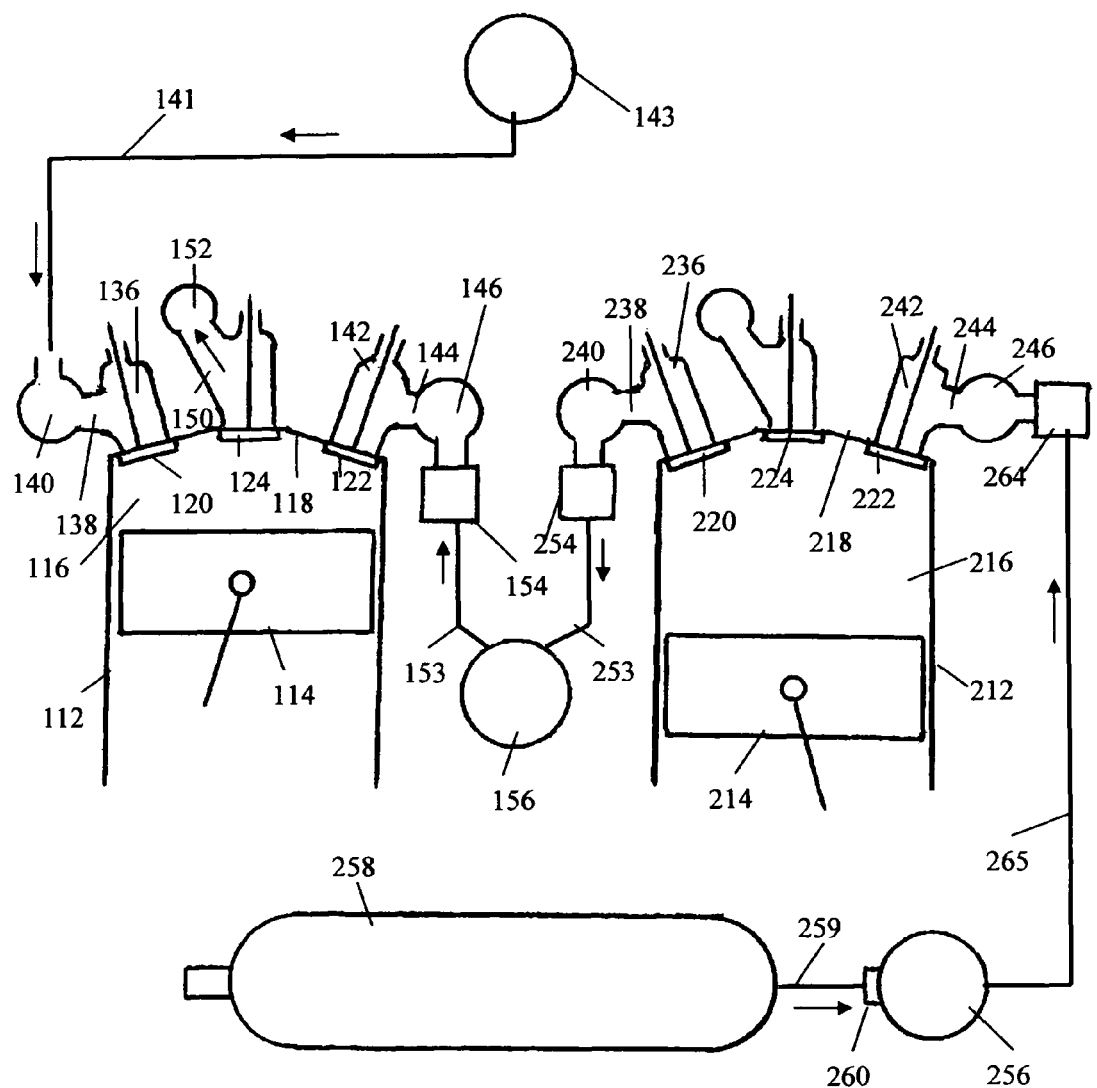
FIG. 13A illustrates the pattern of the air flow in the engine system shown in FIG. 3 during operation in a two-stage air-motor mode using air from the long-term storage reservoir and atmospheric air.

To prevent excessively low temperature in the engine cylinders after air expansion, it is, sometimes, desirable to mix the compressed air, flowing into the engine from the long-term storage reservoir, with certain amount of atmospheric air. For this, the cycle, in each primary cylinder, should include two volume-increasing piston strokes. Atmospheric air is received into the primary cylinder during a first volume-increasing stroke and is compressed during subsequent first volume decreasing stroke. Compressed air is received from the long-term storage reservoir into the cylinder during a second volume-increasing stroke. FIG. 13A illustrates such operation. The arrangement is the same as illustrated in FIG. 13, except exhaust valve 124 is operational. Atmospheric air flows from intake system 143 through duct 141, first intake manifold 140, first passage 138, first port 136 and first air valve 120 into cylinder chamber 116. During the first air-decreasing stroke, that air is compressed. The rest of the cycle is the same as described above and illustrated in FIG. 13, except for the final exhaust, which is through exhaust valve 124 into exhaust manifold 152.

In another variant of the above concept, both atmospheric air and compressed air are inducted into the primary cylinder sequentially during a single piston stroke, with atmospheric air induction preceding the induction of compressed air. This eliminates the need for additional piston stroke. In still another variant, atmospheric air is inducted during the volume-increasing stroke and the compressed air is inducted during subsequent volume-decreasing stroke. FIGS. 13A and 13 remain valid illustrations of the above variants of the concept.

Intake of atmospheric air, followed by induction of atmospheric air, can also be used in secondary cylinder. Here, FIG. 3 is a helpful illustration. Atmospheric air can flow into cylinder chamber 216 from intake system 143 (FIG. 3) through duct 241 (FIG. 3), switching arrangement 264 and air valve 222 or, alternatively, through duct 145 (FIG. 3), switching arrangement 254 and air valve 220. In such case, the switching arrangement repeatedly switches connection from the source of atmospheric air to the source of compressed air. Alternatively, an additional air conduit may be used for providing selective connection between secondary cylinder 212 and outside atmosphere.

AIR-POWER-ASSISTED OPERATION—During air-power-assisted operation, the engine operates both as an internal-combustion engine using fuel from the vehicle fuel tank and as an air motor using compressed air from the air-storage reservoirs in the same cycle. Compressed air is received from the reservoirs into the engine cylinders, expanded there and used for combustion in a conventional internal-combustion cycle. Fuel is added to the air either before or after it enters the cylinder.

Figure 14:
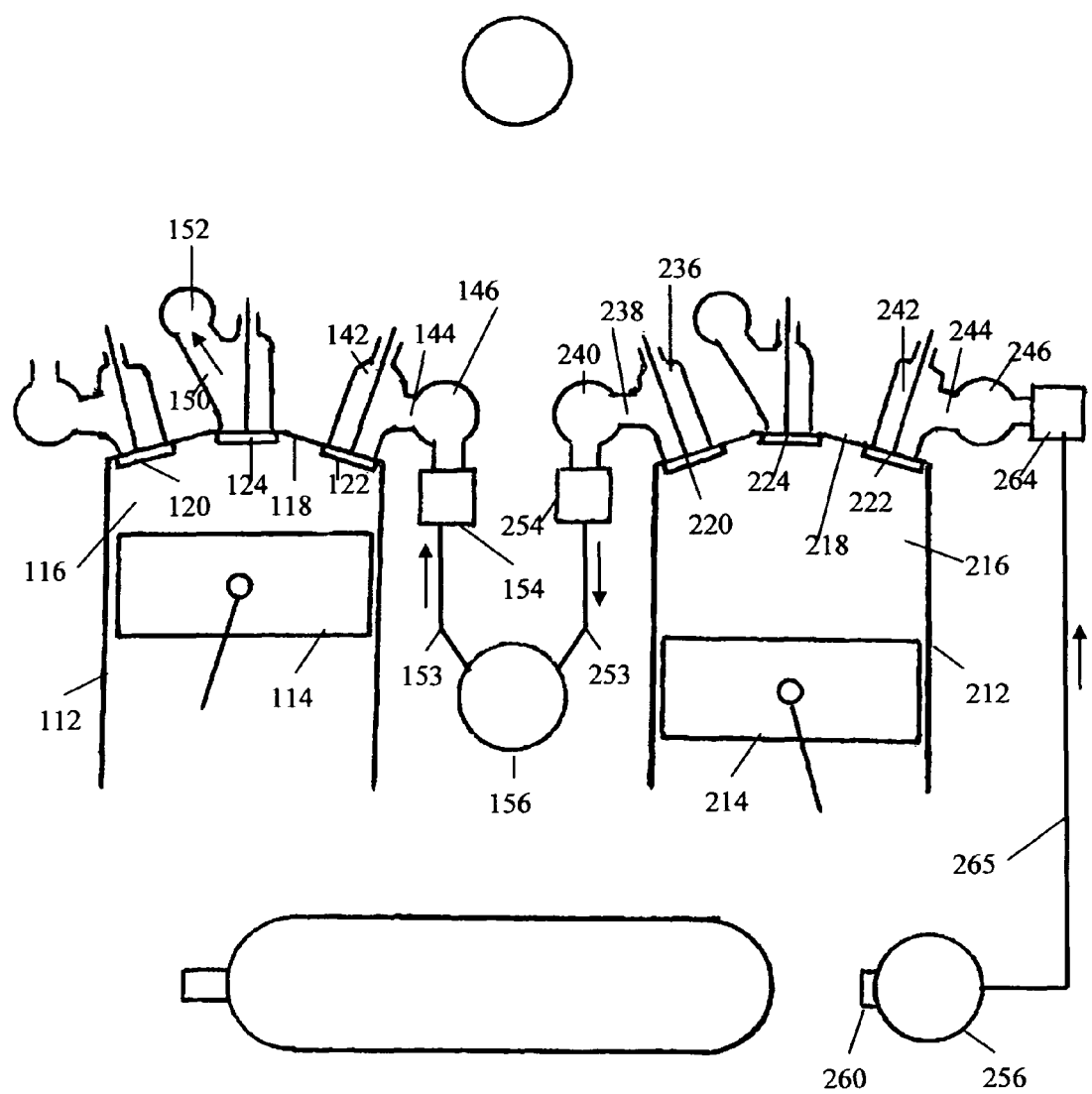
FIG. 14 illustrates the pattern of the air flow in the engine system shown in FIG. 3 during operation in a two-stage air-power-assist mode using air from the short-term storage reservoir.

FIG. 14 illustrates air-power-assisted operation using compressed air from short-term storage reservoir 256. First primary air valve 120 and secondary exhaust valve 224 are deactivated, switching arrangement 154 connects second primary air manifold 146 to first short-term storage reservoir 156, switching arrangement 254 connects first secondary air manifold 240 to first short-term storage reservoir 156 and switching arrangement 264 connects second secondary air manifold 246 to second short-term storage reservoir 256. Connecting valve 260 is closed.

In secondary cylinder 212, during piston 214 volume-increasing stroke, when piston 214 moves away from head 218, compressed air enters cylinder chamber 216 and expands there. The air flows from second short-time storage reservoir 256 through duct 265, switching arrangement 264, second secondary air manifold 246, second secondary passage 244, second secondary port 242 and second secondary air valve 222 into cylinder chamber 216. During piston 214 volume-decreasing stroke, when piston 214 moves towards head 218, air is displaced from cylinder chamber 216 into first short-term storage reservoir 156. The air flows from cylinder chamber 216 through first secondary air valve 220, first secondary port 236, first secondary passage 238, first secondary air manifold 240, switching arrangement 254 and duct 253 into first short-term storage reservoir 156.

In primary cylinder 112, during piston 114 volume-increasing stroke, when piston 114 moves away from head 118, compressed air enters cylinder chamber 116 and further expands there. The air flows from first short-term storage reservoir 156 through duct 153, switching arrangement 154, second primary air manifold 146, second primary passage 144, second primary port 146 and second primary air valve 122 into cylinder chamber 116. During the rest of the cycle, the expanded air is used to perform a conventional internal-combustion cycle. At the end of the combustion cycle, the exhaust gas is expelled into outside atmosphere. It flows from cylinder chamber 116 through exhaust valve 124 and exhaust passage 150 into exhaust manifold 152. The direction of the air flow is shown in FIG. 14 by arrows.

Control system 170 (FIG. 4) controls operation of valves 122, 124, 220 and 222, and of switching arrangements 154, 254 and 264 in accordance with a program incorporated in its software.

Figure 15:
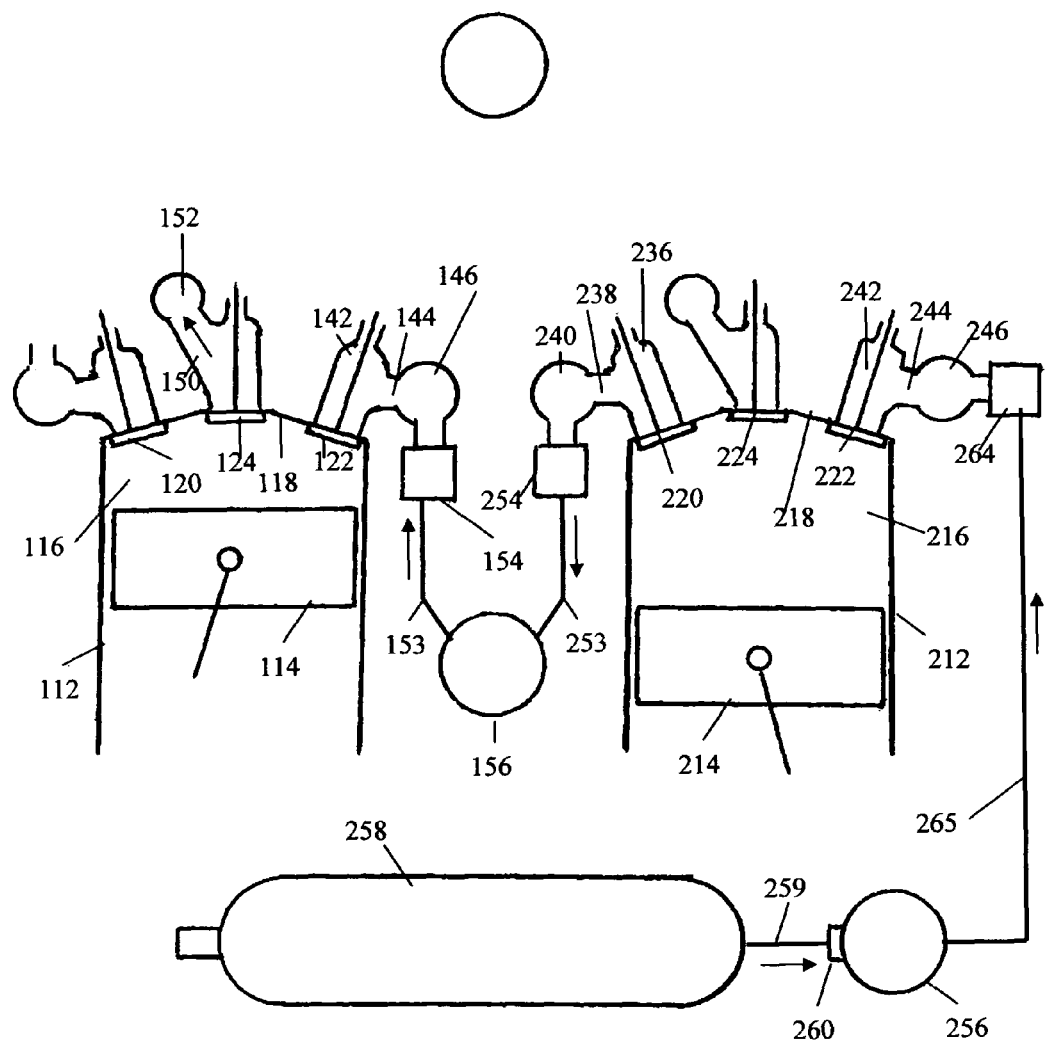
FIG. 15 illustrates the pattern of the air flow in the engine system shown in FIG. 3 during operation in a two-stage air-power-assist mode using air from the long-term storage reservoir.

FIG. 15 illustrates air-power-assisted operation using compressed air from long-term storage reservoir 258. First primary air valve 120 and secondary exhaust valve 224 are deactivated, switching arrangement 154 connects second primary air manifold 146 to first short-term storage reservoir 156, switching arrangement 254 connects first secondary air manifold 240 to first short-term storage reservoir 156 and switching arrangement 264 connects second secondary air manifold 246 to second short-term storage reservoir 256. Connecting valve 260 is open, and long-term storage reservoir 258 is connected to reservoir 256 via duct 259 and valve 260.

In secondary cylinder 212, during piston 214 volume-increasing stroke, when piston 214 moves away from head 218, compressed air enters cylinder chamber 216 and expands there. The air flows from long-term storage reservoir through duct 259 and connecting valve 260 into second short-time storage reservoir 256, and from there through duct 265, switching arrangement 264, second secondary air manifold 246, second secondary passage 244, second secondary port 242 and second secondary air valve 222 into cylinder chamber 216. During piston 214 volume-decreasing stroke, when piston 214 moves towards head 218, air is displaced from cylinder chamber 216 into first short-term storage reservoir 156. The air flows from cylinder chamber 216 through first secondary air valve 220, first secondary port 236, first secondary passage 238, first secondary air manifold 240, switching arrangement 254 and duct 253 into first short-term storage reservoir 156.

In primary cylinder 112, during piston 114 volume-increasing stroke, when piston 114 moves away from head 118, compressed air enters cylinder chamber 116 and further expands there. The air flows from first short-term storage reservoir 156 through duct 153, switching arrangement 154, second primary air manifold 146, second primary passage 144, second primary port 142 and second primary air valve 122 into cylinder chamber 116. During the rest of the cycle, the expanded air is used to perform a conventional internal-combustion cycle. At the end of the combustion cycle, the exhaust gas is expelled into outside atmosphere. It flows from cylinder chamber 116 through exhaust valve 124 and exhaust passage 150 into exhaust manifold 152. The direction of the air and gas flow is shown in FIG. 15 by arrows.

Control system 170 (FIG. 4) controls operation of connecting valve 260, of valves 122, 124, 220 and 222, and of switching arrangements 154, 254 and 264 in accordance with a program incorporated in its software.

To prevent excessively low temperature in the engine cylinders after air expansion, it is, sometimes, desirable to mix the compressed air, flowing into the engine from the long-term storage reservoir, with certain amount of atmospheric air. For this, the cycle, in each primary cylinder, should include three volume-increasing piston strokes. Atmospheric air is received into the primary cylinder during a first volume-increasing stroke and is compressed during subsequent first volume decreasing stroke. Compressed air is received from the long-term storage reservoir into the primary cylinder during a second volume-increasing stroke. FIG. 13A illustrates such operation. The arrangement is the same as illustrated in FIG. 15, except duct 141 is used. Atmospheric air flows from intake system 143 through duct 141, first intake manifold 140, first passage 138, first port 136 and first air valve 120 into cylinder chamber 116. During the first air-decreasing stroke, that air is compressed. The rest of the cycle is the same as described above and illustrated in FIG. 15.

In another variant of the above concept, both atmospheric air and compressed air are inducted into the primary cylinder sequentially during a single piston stroke, with atmospheric air induction preceding the induction of compressed air. This eliminates the need for additional piston stroke. In still another variant, atmospheric air is inducted during the volume-increasing stroke and the compressed air is inducted during subsequent volume-decreasing stroke. FIGS. 13A and 15 remain valid illustrations of the above variants of the concept.

Intake of atmospheric air, followed by induction of atmospheric air, can also be used in secondary cylinder. Here, FIG. 3 is a helpful illustration. Atmospheric air can flow into cylinder chamber 216 from intake system 143 (FIG. 3) through duct 241 (FIG. 3), switching arrangement 264 and air valve 222 or, alternatively, through duct 145 (FIG. 3), switching arrangement 254 and air valve 220. In such case, the switching arrangement repeatedly switches connection from the source of atmospheric air to the source of compressed air. Alternatively, an additional air conduit may be used for providing selective connection between secondary cylinder 212 and outside atmosphere.

3. Conventional Internal-Combustion Mode.

Figure 16:
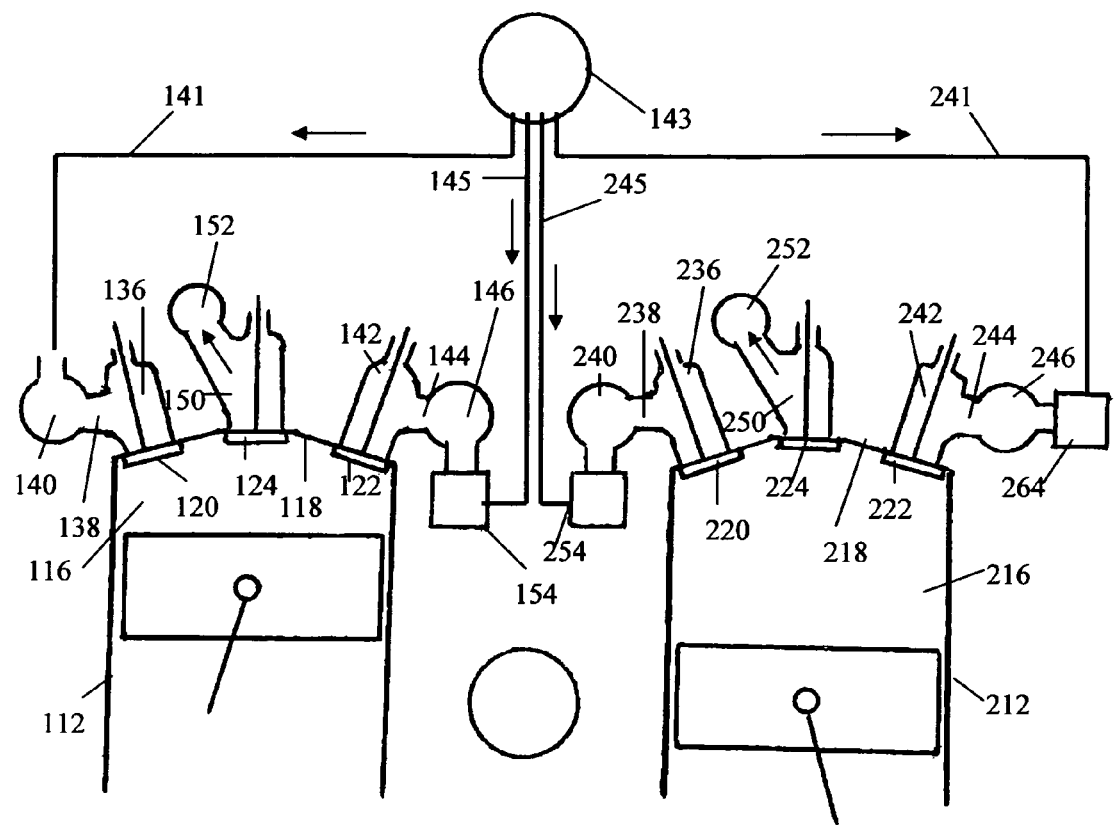
FIG. 16 illustrates the pattern of the air flow in the engine system shown in FIG. 3 during operation as a conventional internal-combustion engine.

To switch from any air-hybrid mode to conventional internal combustion, switching arrangements 154, 254 and 264 (FIG. 16) connect second primary air manifold 146, first secondary air manifold 240 and second secondary air manifold 246 to intake system 143. The engine operates as a conventional internal-combustion engine receiving air only from outside atmosphere. FIG. 16 illustrates the air and gas flow in this mode. In primary cylinder 112, atmospheric air flows from intake system 143 into cylinder chamber 116 through duct 141, first air manifold 140, first passage 138, first primary port 136 and first primary air valve 120; and through duct 145, switching arrangement 154, second primary air manifold 146, second primary passage 144, second primary port 142 and second primary air valve 122. Exhaust gas is expelled from cylinder chamber 116 into exhaust manifold 152 through exhaust valve 124 and primary exhaust passage 150.

In secondary cylinder 212, atmospheric air flows from intake system 143 into cylinder chamber 216 through duct 245, switching arrangement 254, first secondary air manifold 240, first secondary passage 238, first secondary port 236 and first secondary air valve 220; and through duct 241, switching arrangement 264, second secondary air manifold 246, second secondary passage 244, second secondary port 242 and second secondary air valve 222. Exhaust gas is expelled from cylinder chamber 216 into exhaust manifold 252 through exhaust valve 224 and secondary exhaust passage 250.

Four-Stroke and Two-stroke Internal-Combustion Operation

Figure 24:
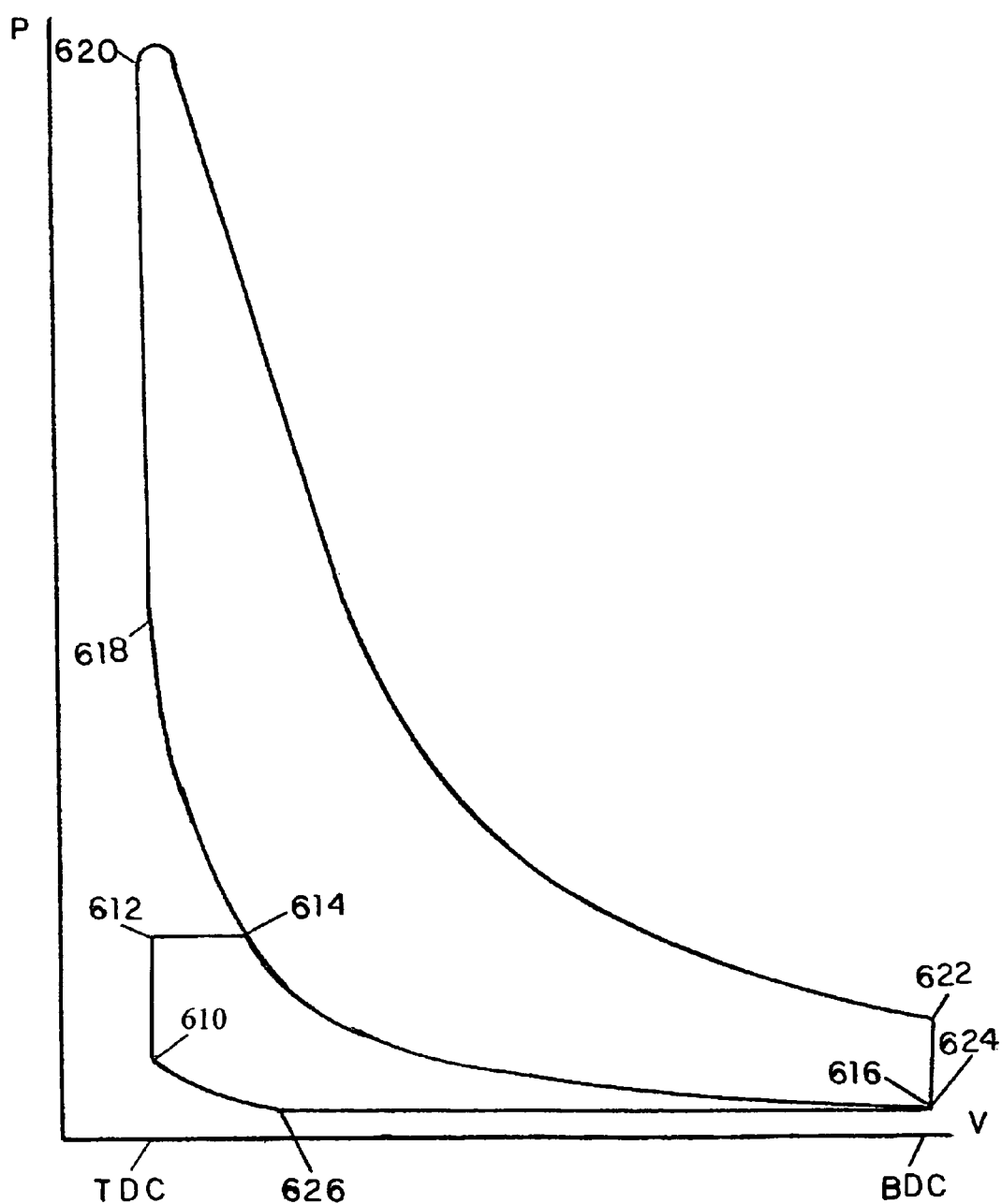
FIG. 24 is a pressure-volume diagram illustrating a four-stroke air-power-assisted cycle.
Figure 25:
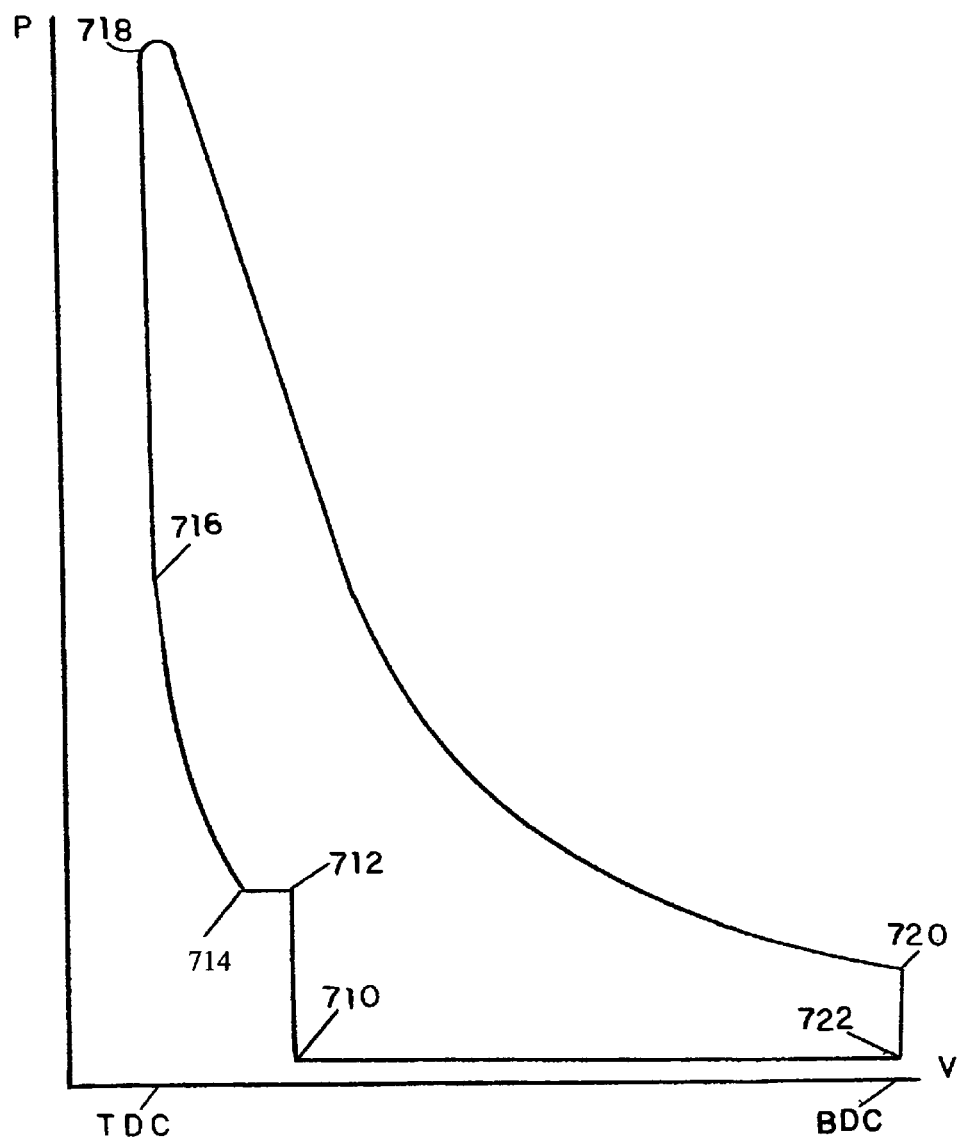
FIG. 25 is a pressure-volume diagram illustrating a two-stroke air-power-assisted cycle.

Availability of compressed air, during operation in air-power-assisted mode, permits the engine to be selectively operated either in a four-stroke or in a two-stroke internal-combustion cycle. This applies to both single stage and two-stage operations. Pressure-volume diagrams of the four-stroke and two-stroke cycles are illustrated in FIGS. 24 and 25, respectively. In the diagrams, P and V denote pressure and volume, respectively. BDC and TDC denote bottom-dead-center and top-dead-center, respectively. The descriptions are given as applied to the cases shown in FIGS. 14 and 15, but they also apply to FIGS. 8 and 9.

Four-stroke cycle—A typical idealized pressure-volume diagram of the four-stroke internal-combustion cycle performed in primary cylinder 112 (FIG. 15) is shown in FIG. 24. Second primary valve 122 (FIG. 15) opens at a point 610 and pressure in the cylinder increases to the level of pressure in first short-term pressure reservoir 156 (FIG. 15), which corresponds to a point 612. From point 612 to a point 614 piston 114 (FIG. 15) is displaced by a nearly constant air-pressure in cylinder chamber 116 (FIG. 15). This period takes place during a first part of a first volume-increasing stroke. At point 614, second primary valve 122 closes, and from point 614 to a point 616, which is at the bottom-dead-center, the air-charge in cylinder chamber 116 expands. This takes place during a second part of the first volume-increasing stroke.

From point 616 to a point 618 the cylinder charge is compressed and from point 618 to a point 620 heat generated by combustion increases its pressure at nearly constant volume. This period takes place during a first volume-decreasing stroke. From point 620 to a point 622 combustion is completed, and the expanding combustion gas displaces piston 114 until it reaches its bottom-dead-center at point 622. This takes place during a second volume-increasing stroke.

Exhaust valve 124 (FIG. 15) opens at or shortly before the bottom-dead-center, and the pressure in the cylinder drops to a level equal to the pressure in exhaust manifold 152, as shown at a point 624 (it coincides with point 616 in the diagram). From point 624 to a point 626 combustion gas is expelled from cylinder chamber 116 through the open exhaust valve 124. This period takes place during a first part of a second volume-decreasing stroke. At point 626, exhaust valve 124 closes, and from point 626 to point 610 all valves are closed, and residual-gas compression takes place. This takes place during a second part of the second volume-decreasing stroke.

Two-stroke cycle—A typical idealized pressure-volume diagram of the two-stroke internal-combustion cycle, performed in primary cylinder 112 (FIG. 15), is shown in FIG. 25. Second air valve 122 (FIG. 15) opens at a point 710 and pressure in the cylinder increases to the level of pressure in first short-term reservoir 156 (FIG. 15) during a volume-decreasing stroke of piston 114 (FIG. 15), which corresponds to a point 712. From point 712 to a point 714 piston 114 moves against nearly constant pressure in cylinder chamber 116 (FIG. 15). This takes place during a second part of the volume-decreasing stroke.

At point 714, second air valve 122 closes, from point 714 to a point 716 the cylinder charge is compressed, and from point 716 to a point 718 heat from combustion increases its pressure at nearly constant volume. This takes place during a third part of the volume-decreasing stroke.

From point 718 to a point 720, combustion is completed, and the expanding combustion gas displaces piston 114 until it reaches its bottom-dead-center at point 720. This takes place during the volume-increasing stroke.

Exhaust valve 124 (FIG. 15) opens at or shortly before the bottom-dead-center, and the pressure in the cylinder drops to nearly atmospheric pressure, as shown at a point 722. After point 722, upward motion of piston 114 expels combustion gas from cylinder chamber 116 (FIG. 15) through the open exhaust valve 124 into exhaust manifold 152 (FIG. 15), until the valve closes. This takes place during a first part of the volume-decreasing stroke. Timing of exhaust valve 124 closure determines the quantity of residual gas retained in the cylinder. A preferred timing of exhaust valve 124 closing coincides with the timing of second air valve 122 opening at point 710. From then on, the same cycle is repeated again during the next engine revolution.

Operation of primary cylinders can be switched from a four-stroke cycle to a two-stroke cycle or vice versa, simply by changing the sequence and frequency of operation of the engine valves, injectors, and spark plugs (when applicable). Ability to selectively switch the primary cylinders operation from a four-stroke cycle to a two-stroke cycle and back is an important advantage. A switch from the four-stroke to the two-stroke cycle doubles the number of combustion events at a given engine speed, which leads to a significant step-up in engine torque and power. This is especially useful during acceleration from a low vehicle speed, when a sudden increase in torque is very desirable.

Operation in the Mountains

Mountain driving often involves prolonged periods of ascent from a lower elevation to a higher one, each followed by a period of descent to a lower elevation. In vehicles with conventional engines, such driving involves substantial energy losses. During each such descent, vehicle speed is restricted by absorbing the potential energy of vehicle mass in friction braking and engine pumping, and irreversibly converting that energy into waste heat. During subsequent ascent, additional fuel is spent to lift the vehicle to a higher altitude.

An air-hybrid system of the present invention can substantially reduce such energy losses by storing the energy during descent and recovering it during subsequent ascent. During descent, the engine operates in a compression-braking mode receiving atmospheric air, compressing it and depositing it into the long-term storage reservoir. During subsequent ascent, that compressed air is used to assist the engine in driving the vehicle uphill.

Figure 17:
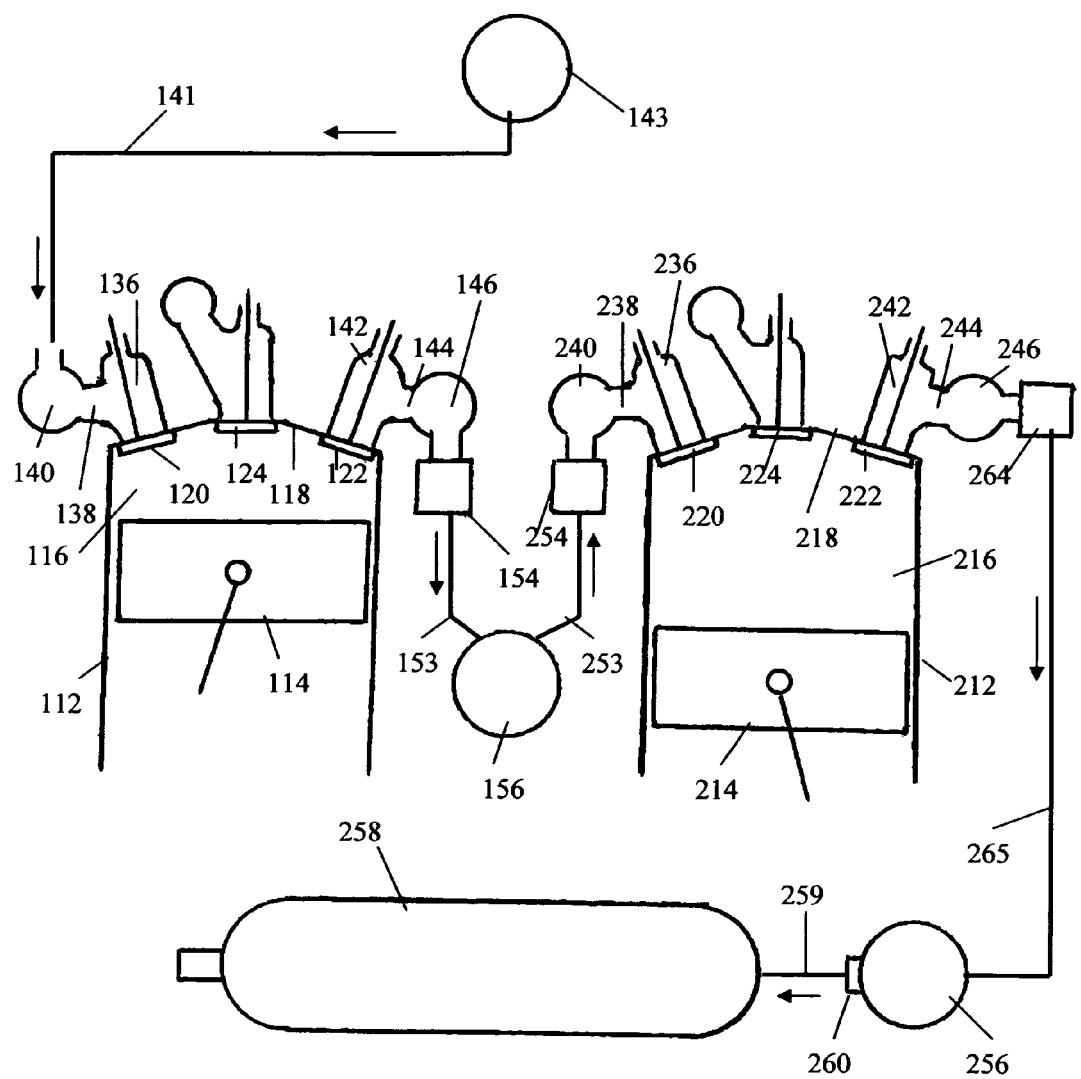
FIG. 17 illustrates the pattern of the air flow in the engine system shown in FIG. 3 during operation in a two-stage compression-braking mode when driving in the mountains.

FIG. 17 illustrates an example of a two-stage compression braking mode that charges long-term storage reservoir 258 with compressed air during vehicle descent. During compression braking, no fuel is supplied into the engine cylinders, and the engine operates as a reciprocating-piston two-stage compressor driven from the vehicle wheels by vehicle motion. Air is received from outside atmosphere into the engine cylinders, compressed there, and displaced into long-term storage reservoir 258. Exhaust valves 124 and 224 are deactivated, switching arrangement 154 connects second primary air manifold 146 to first short-term storage reservoir 156, switching arrangement 254 connects first secondary air manifold 240 to first short-term storage reservoir 156 and switching arrangement 264 connects second secondary air manifold 246 to second short-term storage reservoir 256. Connecting valve 260 is open.

In primary cylinder 112, during piston 114 volume-increasing stroke, when piston 114 moves away from head 118, atmospheric air enters cylinder chamber 116. The air flows from intake system 143 through duct 141, first primary air manifold 140, first primary passage 138, first primary port 136 and first primary air valve 120 into cylinder chamber 116. During piston 114 volume-decreasing stroke, when piston 114 moves towards head 118, air is compressed in cylinder chamber 116 and then displaced into first short-term storage reservoir 156. The air flows from cylinder chamber 116 through second primary air valve 122, second primary port 142, second primary passage 144, second primary air manifold 146, switching arrangement 154 and duct 153 into first short-term storage reservoir 156.

In secondary cylinder 212, during piston 214 volume-increasing stroke, when piston 214 moves away from head 218, compressed air enters cylinder chamber 216. The air flows from first short-term storage reservoir 156 through duct 253, switching arrangement 254, first secondary air manifold 240, first secondary passage 238, first secondary port 236 and first secondary air valve 220 into cylinder chamber 216. During piston 214 volume-decreasing stroke, when piston 214 moves towards head 218, air is further compressed in cylinder chamber 216 and then displaced into long-term storage reservoir 258. The air flows from cylinder chamber 216 through second secondary air valve 222, second secondary port 242, second secondary passage 244, second secondary air manifold 246, switching arrangement 264, duct 265, second short-term storage reservoir 256, connecting valve 260 and duct 259 into long-term storage reservoir 258.

The direction of the air flow is shown in FIG. 17 by arrows. Control system 170 controls operation of air valves 120, 122, 220 and 222, and of switching arrangements 154, 254 and 264 in accordance with a program incorporated in its software.

During subsequent uphill drive, the energy of compressed air previously deposited into the long-term storage reservoir during descent is used to assist in the vehicle ascent by operating the system in a single-stage or two-stage air-motor mode, or in a single-stage or two-stage air-power assisted mode that were previously described and illustrated in FIGS. 7, 9, 13 and 15.

Heating the Air

Figure 18:
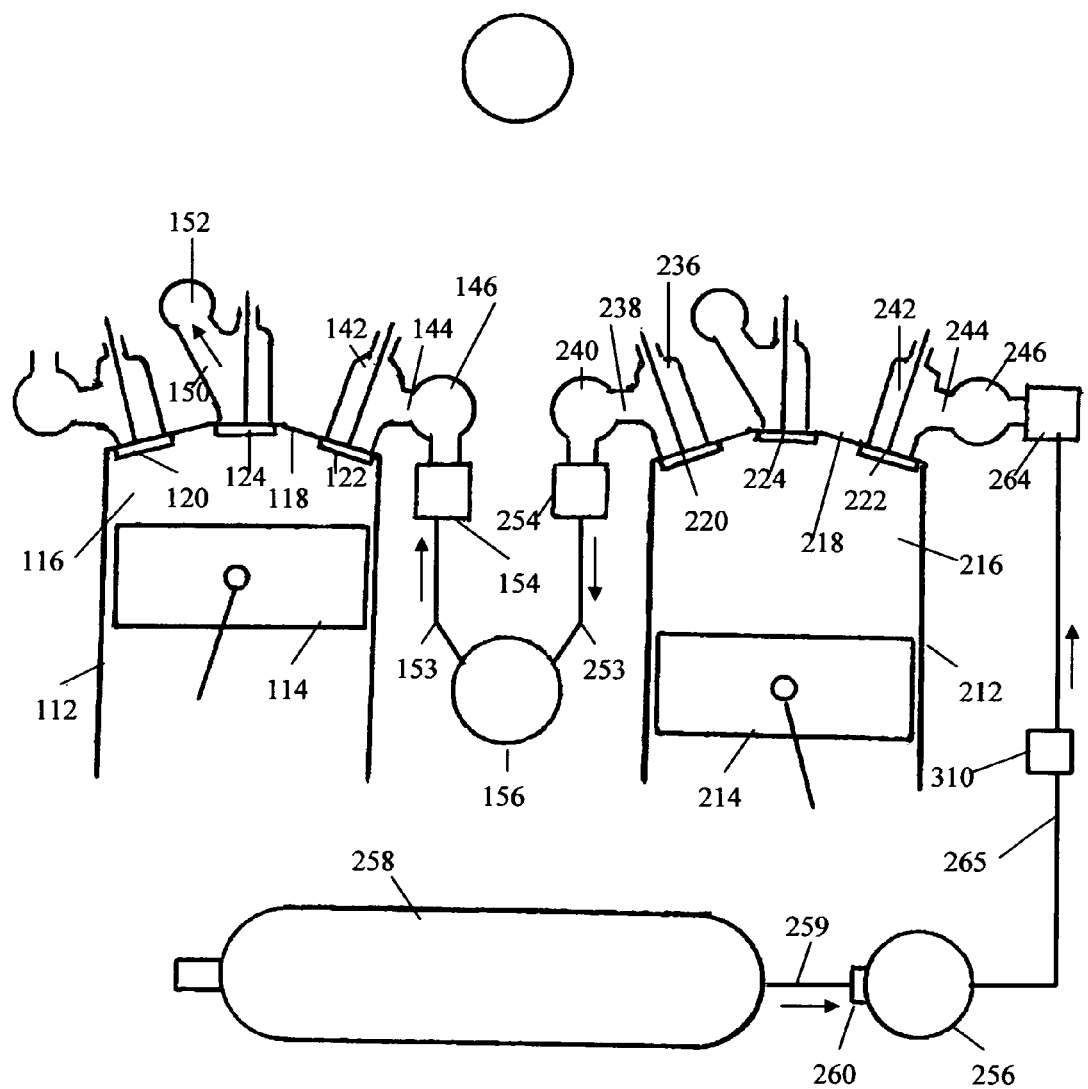
FIG. 18 illustrates the pattern of the air flow in the engine system shown in FIG. 3 during operation in a two-stage air-power-assist mode using heated air from the long-term storage reservoir.

It is often desirable to heat the air flowing from the long-term storage reservoir into the engine. Heating accomplishes two objectives: it increases the power of the engine during operation in the air-expansion mode, and it prevents excessively low air temperature after expansion in the engine. FIG. 18 illustrates an example of a system that includes an air heater 310 incorporated into duct 265 (FIG. 13). It is shown as applied to the case illustrated in FIG. 13, but it can be applied to all other cases.

Various types of heaters can be used. For example, it can be a conduction-type heater, in which hot heating fluid flows through pipes and transfers heat to the air flowing outside the pipes. However, one of the most efficient ways to transfer heat energy to the air is by burning a small amount of fuel directly in that air.

Figure 19:
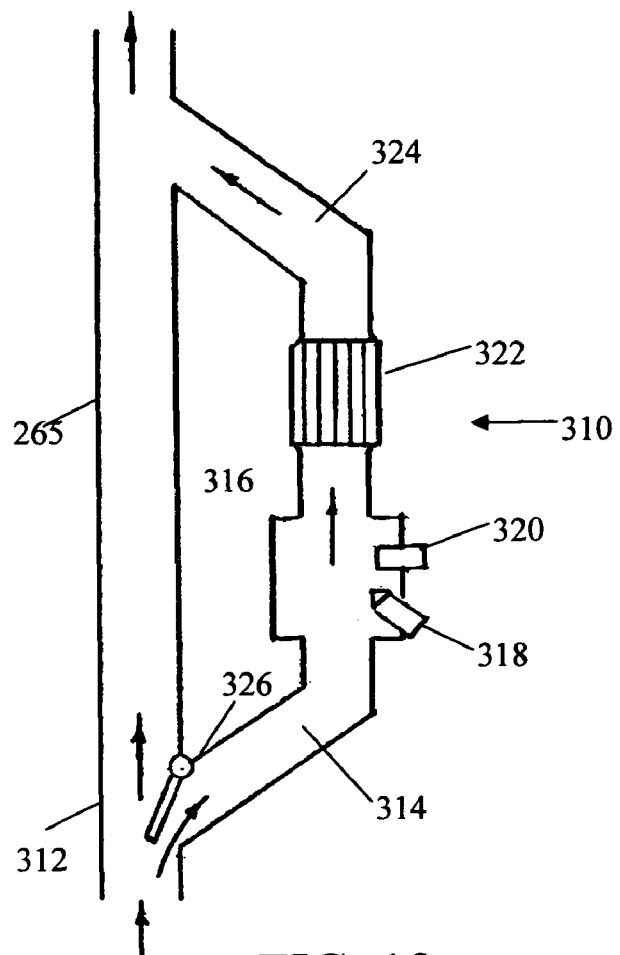
FIG. 19 is a schematic diagram illustrating an air heater useable with the present invention.

FIG. 19 illustrates an example of a heater 310 with direct in-air combustion. It is shown as applied to the case shown in FIG. 18), but it can be applied to all other cases. Air flowing through duct 265 encounters an adjustable plate valve 312 that directs a part of the air flow into a first pipe 314 leading to a burner 316. A controllable fuel injector 318 and an igniter 320, such as a spark plug or a glow plug, are installed in burner 316. A small amount of fuel is injected into the flow of air in burner 316 and is ignited by igniter 320 producing hot combustion gas. The hot gas flows through a catalytic converter 322 that eliminates harmful components from the combustion gas. Then, the hot combustion gas flows through a second pipe 324 back into duct 265. There it is mixed with the main air flow thus raising its temperature. The amount of air flowing into first pipe 314 can be controlled by varying the position of plate valve 312, which is rotatable about a pivot 326. Fuel injector 318 controls the amount of fuel injected. When there is no need to heat the air, plate valve 312 closes the entrance to first pipe 314, and fuel injection into burner 316 is terminated.

An alternative method of preventing excessively low air temperature can be used when the engine operates in a two-stage air-power-assisted mode using air from the long-term storage reservoir. For this, the engine cooling system should include an auxiliary heat-conservation system of fluid conduits that is installed in-parallel to engine conventional heat-management system. That system operates in a heat-conservation mode only when the engine operates in a proper air-power-assisted mode.

Figure 27:
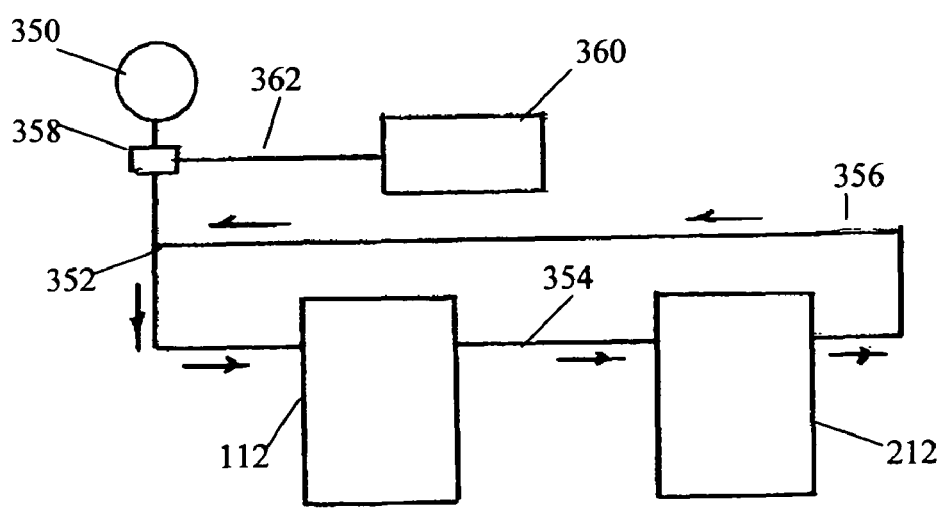
FIG. 27 is a schematic diagram illustrating the pattern of fluid flow in a heat-conservation system useable with the present invention.

FIG. 27 illustrates the fluid flow in the heat-conservation system during operation in heat-conservation mode. Arrows in the drawing show the direction of the fluid flow. Primary cylinder 112 (FIG. 15) operates in internal combustion mode. Secondary cylinder 212 (FIG. 15) operates in air-motor mode. Primary cylinder 112 receives low-temperature fluid, with temperature not higher than 20 degrees Celsius above its melting point, via a conduit 352. After flowing through primary cylinder 112 cooling passages and absorbing some of heat of combustion, the fluid turns into high-temperature fluid, with temperature not lower than 10 degrees below its boiling point, and flows, through conduit 354 into the cooling passages of secondary cylinder 212. There, the high-temperature fluid transfers some of its heat to the cold air in cylinder 212 and turns into cold-temperature fluid. The cold-temperature fluid exits cylinder 212 and flows through a conduit 356 into conduit 352 and back into cylinder 112. In that way, some of the combustion heat taken out of the gas in cylinder 112 by the fluid is returned to cylinder 112 by air flowing from cylinder 212 into cylinder 112. This improves fuel efficiency of the engine.

A source of fluid 350 is equipped with a switching box 358 containing controllable valves (not shown) that can selectively direct the fluid either into the above described heat-conservation system via conduit 352 or into a conventional engine heat-management system 360 via a conduit 362. A control system 170 (FIG. 4) controls operation of switching box 358. When the engine operates in an air-power-assisted mode using air from long-term storage reservoir 258 (FIG. 15), switching box 358 directs fluid into the heat-conservation system. In all other operational modes, switching box 358 directs fluid into conventional heat-management system 360.

Charging the Long-Term Storage Reservoir

The long-term storage reservoir can be charged with compressed air whenever the vehicle is parked and an outside source of energy is available. For example, charging can be performed while the vehicle is parked overnight in the vehicle owner's garage equipped with a power outlet.

Figure 20:
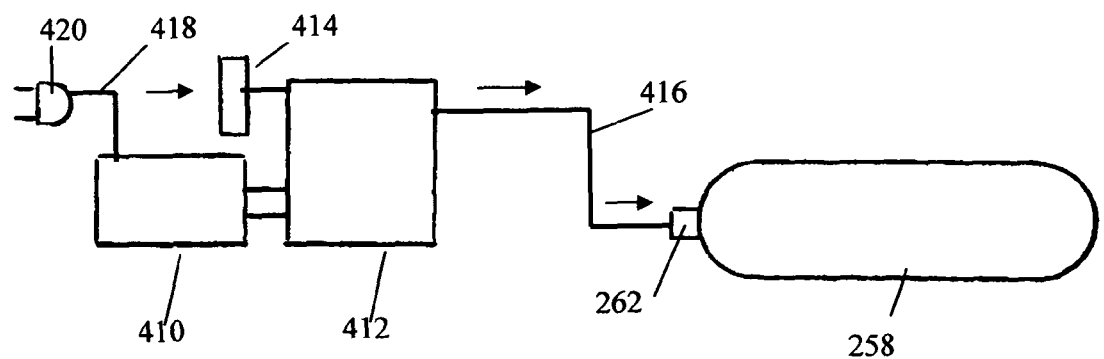
FIG. 20 is a schematic diagram illustrating charging the long-term storage reservoir by an electrically-driven compressor using an energy supply located outside the vehicle.

An air compressor can be used for charging the reservoir. FIG. 20 shows an example of such system. It is shown as applied to the case illustrated in FIG. 3, but it can also be applied to the case shown in FIG. 1. A compressor 412 driven by an electric motor 410 receives atmospheric air through an air filter 414 and displaces compressed air through a high-pressure hose 416 and further through charging port 262 into long-term storage reservoir 258. Electric motor 410 can be plugged-in into an electric power outlet via an electric cable 418 with an electric plug 420. Charging port 262 contains a one-way valve (not shown) that prevents backflow of air. Connecting valve 260 is closed.

The above described system can be an on-board installation that is an integral part of the vehicle or, alternatively, it can be a stationary installation outside the vehicle.

Figure 21:
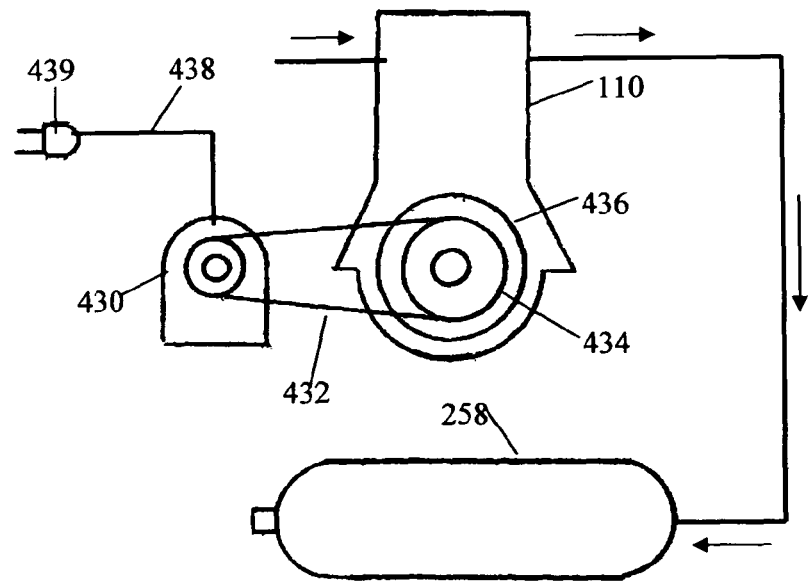
FIG. 21 is a schematic diagram illustrating charging the long-term storage reservoir by the vehicle engine using an energy supply located outside the vehicle.

In some cases, the vehicle engine itself can be used as a compressor charging the long-term storage reservoir. FIG. 21 shows an example of such arrangement. It is shown as applied to the case illustrated in FIG. 17. An on-board electric motor 430 drives engine 110 through a belt (or chain) drive 432. Electric motor 430 can be plugged-in into an electric power outlet via an electric cable 438 with an electric plug 439. A driven pulley (or sprocket) 434 can be connected to engine 110 crankshaft (not shown) through a normally disengaged clutch 436 that is engaged only when electric motor 430 is plugged-in. Engine 110 is set into compression-braking mode and, when electric motor 430 is actuated, engine 110 pumps compressed air into long term storage reservoir 258. The pattern of the air flow from engine 110 to reservoir 258 is the same as illustrated in FIG. 17. When electric motor 430 is disconnected from the electric power source, clutch 436 is disengaged.

Figure 22:
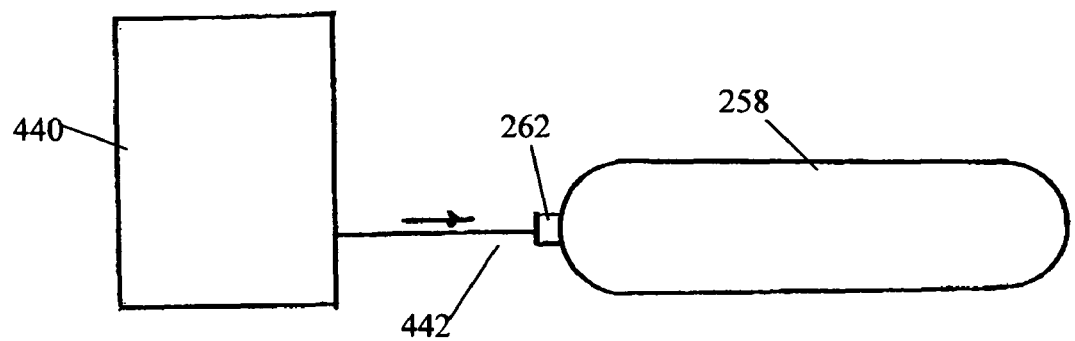
FIG. 22 is a schematic diagram illustrating charging the long-term storage reservoir from a compressed-air reservoir located outside the vehicle.

An alternative way to charge the long-term storage reservoir is by connecting it to a large tank with compressed air. FIG. 22 shows long-term storage reservoir 258 being charged with compressed air from a tank 440 through a high-pressure hose 442 connecting tank 440 to charging port 262 of reservoir 258.

CONCLUSION, RAMIFICATION AND SCOPE

Accordingly, it should be evident to the reader that the plug-in air-hybrid system and method that is the subject of the present invention can assure a substantial improvement in vehicle fuel economy and a reduction in harmful exhaust emissions. Moreover, it can do this with much greater effectiveness than a conventional air hybrid can. A plug-in air-hybrid system combines the concept of saving the vehicle braking energy as compressed air and using it for subsequent compressed-air assist with the concept of an additional compressed-air assist provided by an on-board rechargeable compressed-air reservoir using an outside source of electric energy for its periodic recharging with compressed air. In this way, electric power from an electric grid is indirectly used for air-hybrid vehicle propulsion replacing some of the hydrocarbon fuel. Since electric power is substantially less expensive than the hydrocarbon fuel it replaces, using the plug-in air hybrid for vehicle propulsion provides substantial operational cost savings to the vehicle owner. A plug-in air hybrid replaces energy derived from hydrocarbon fuel by energy derived from other sources, and if used on a large scale, can contribute to a significant reduction in crude oil import and in an improvement in the U.S. balance of payments.

Although the description above contains much specificity, that should not be construed as limiting the scope of the invention, but as merely providing illustrations of some of the presently preferred embodiments of this invention. For example, although the description considered that, in air-motor mode, air, after expansion, is exhausted into the atmosphere through the vehicle intake system, in some cases the air may be exhausted into the exhaust system. Also, the detailed description mostly considered that fuel was added to air directly into the engine cylinder. In many other cases, however, fuel may be added to air before it enters the cylinder. Sometimes, camshafts with phase shifters can be used instead of individual valve actuators. It was also considered that, in two-stage operation, air was transferred from one cylinder to another through a medium-pressure reservoir. In some cases, however, it may be possible to transfer air directly from one cylinder to another. Also in some cases, compressed air flowing from and into the long-term storage reservoir may bypass the short-term storage reservoir. It is possible to operate with a two-stage compression and single-stage expansion or vice versa. It is also possible to use two-stage compression and two-stage expansion when using air from the short-term storage reservoir, while using single-stage compression and single-stage expansion when using air fro the long-term storage reservoir or vice versa.

Thus, while certain embodiments of the present invention have been described in detail, those familiar with the art, to which this invention relates, will recognize various alternative designs and embodiments for practicing this invention as defined by the following claims.

I claim:

1. A method of operating a wheeled vehicle, said method comprising the steps of:
   (a) providing an engine mounted in said vehicle and coupled to at least one vehicle wheel for its propulsion and braking, said engine including:
      (1) at least two cylinders,
      (2) a cylinder chamber within each of said at least two cylinders,
      (3) at least one head mounted to said at least two cylinders,
      (4) a piston reciprocatably installed in each of said at least two cylinders, with the piston to head and cylinder relationship being such that the volume of said cylinder chamber shrinks during a volume-decreasing stroke, when said piston moves towards said head, and expands during a volume-increasing stroke, when said piston moves away from said head, and
      (5) a crankshaft coupled to said piston for transferring power from said piston to said at least one vehicle wheel, during said vehicle propulsion, and for transferring power from said at least one vehicle wheel to said piston during said vehicle braking,
   (b) providing an air-charging means for producing compressed air, said air-charging means using energy from an energy source outside of said vehicle,
   (c) providing an air-reservoir means mounted in said vehicle and connected to said engine for receiving, storage and discharge of compressed air, said air-reservoir means including:
      (1) at least one short-term storage reservoir, said at least one short-term storage reservoir containing compressed air produced by said engine operating as a compressor during braking, whereby compressed air in said short-term storage reservoir represents energy derived from said vehicle motion, and
      (2) at least one long-term storage reservoir, said at least one long-term storage reservoir containing compressed air produced by said air-charging means, whereby compressed air in said long-term storage reservoir represents energy derived from an outside energy source,
   (d) providing a control means for controlling operation of said engine and said vehicle in response to driver's demands and in accordance with a control program incorporated in said control means,
   (e) providing a gas exchange controlling means for accommodating gas flow into, inside and out of said engine, and between said engine and said air-reservoir means,
   (f) providing a fuel delivery means for selectively and variably adding fuel to the air intended for participation in combustion,
   (g) operating said engine in a mode selected from a set of operational modes including a single-stage compression and expansion mode and a two-stage compression and expansion mode, said single-stage compression and expansion mode including the steps of:
      (1) operating said engine in a single-stage compression-braking mode driven by vehicle momentum in response to a demand for a vehicle braking force by repeatedly performing an air-compression cycle wherein a charge of atmospheric air is compressed in said cylinder chamber and displaced into said at least one short-term storage reservoir for storage therein, whereby energy of vehicle motion is converted into energy of compressed air stored in said at least one short-term storage reservoir, and
      (2) operating said engine in a single-stage air-expansion mode in response to a demand for a vehicle propulsion force by operating in a mode selected from a set of modes including:
         (A) a single-stage air-motor mode comprising repeated performance of a two-stroke air-motor cycle in said engine, wherein compressed air is received into said cylinder chamber from said air-reservoir means and a charge of compressed air contained in said cylinder chamber is expanded in said cylinder chamber, whereby energy of said charge of compressed air is converted into energy of said vehicle motion,
         (B) a single-stage four-stroke air-power-assisted mode comprising repeated performance of a four-stroke air-power-assisted cycle in said engine, said four-stroke air-power-assisted cycle including the steps of:
            (I) receiving a charge of compressed air from said air-reservoir means into said cylinder chamber,
            (II) adding fuel to said charge of compressed air,
            (III) expanding said charge of compressed air in said cylinder chamber, and
            (IV) using said charge of compressed air and said fuel to perform a four-stroke internal-combustion cycle in said cylinder chamber, whereby work of compressed air expansion supplements work performed in said internal-combustion cycle, and (C) a single-stage two-stroke air-power-assisted mode comprising repeated performance of a two-stroke air-power-assisted cycle in said engine, said two-stroke air-power-assisted cycle including the steps of:
   (I) receiving a charge of compressed air from said air-reservoir means into said cylinder chamber,
   (II) adding fuel to said charge of compressed air, and
   (III) using said charge of compressed air and said fuel to perform a two-stroke internal-combustion cycle in said cylinder chamber,
   whereby energy of said charge of compressed air supplements work performed in said internal-combustion cycle, and said two-stage compression and expansion mode including the steps of:

(1) operating said engine in a two-stage compression-braking mode driven by vehicle momentum in response to a demand for a vehicle braking force by repeatedly performing an air-compression cycle including the steps of:
   (A) receiving air from outside atmosphere into at least one of said at least two cylinders,
   (B) compressing said air in said at least one of said at least two cylinders,
   (C) expelling compressed air from said at least one of said at least two cylinders,
   (D) receiving said compressed air into another at least one of said at least two cylinders,
   (E) further compressing said compressed air in said another at least one of said at least two cylinders,
   (F) expelling said compressed air from said another at least one of said at least two cylinders, and
   (G) receiving said compressed air into said at least one short-term reservoir for storage therein,
   whereby energy of vehicle motion is converted into energy of compressed air stored in said at least one short-term storage reservoir, and (2) operating said engine in a two-stage air-expansion mode in response to a demand for a vehicle propulsion force by operating in a mode selected from a set of modes including:
   (A) a two-stage air-motor mode comprising repeated performance of an air-motor cycle comprising the steps of:
      (I) receiving compressed air from said air-reservoir means into said another at least one of said at least two cylinders,
      (II) performing a partial expansion of said compressed air in said another at least one of said at least two cylinders,
      (III) expelling partially-expanded compressed air from said another at least one of said at least two cylinders,
      (IV) receiving said partially-expanded compressed air into said at least one of said at least two cylinders, and
      (V) further expanding said partially-expanded compressed air in said at least one of said at least two cylinders,
      whereby energy of said compressed air is converted into energy of said vehicle motion, (B) a two-stage four-stroke air-power-assisted mode comprising repeated performance of a four-stroke air-power-assisted cycle in said engine, said four-stroke air-power-assisted cycle including the steps of:
      (I) receiving compressed air from said air-reservoir means into said another at least one of said at least two cylinders,
      (II) performing a partial expansion of said compressed air in said another at least one of said at least two cylinders,
      (III) expelling partially-expanded compressed air from said another at least one of said at least two cylinders,
      (IV) receiving said partially-expanded compressed air into said at least one of said at least two cylinders,
      (V) further expanding said partially-expanded compressed air in said at least one of said at least two cylinders,
      (VI) adding fuel to air in said at least one of said at least two cylinders, and
      (VII) using said air and said fuel to perform a four-stroke internal-combustion cycle in said at least one of said at least two cylinders,
      whereby work performed by compressed air supplements work of the internal-combustion cycle performed in said at least one of said at least two cylinders, and (C) a two-stage two-stroke air-power-assisted mode comprising repeated performance of a two-stroke air-power-assisted cycle in said engine, said two-stroke air-power-assisted cycle including the steps of:
      (I) receiving a charge of compressed air from said air-reservoir means into said another at least one of said at least two cylinders,
      (II) performing a partial expansion of said charge of compressed air in said another at least one of said at least two cylinders,
      (III) expelling partially-expanded compressed air from said another at least one of said at least two cylinders,
      (IV) receiving said partially-expanded compressed air into said at least one of said at least two cylinders, and
      (V) adding fuel to air in said at least one of said at least two cylinders,
      (VI) using said air and said fuel to perform a two-stroke internal-combustion cycle in said at least one of said at least two cylinders,
      whereby energy of said charge of compressed air supplements work of the internal-combustion cycle performed in said at least one of said at least two cylinders, whereby using two-stage air compression and two-stage air expansion reduces the required size of said at least one short-term storage reservoir and provides more space for said at least one long-term storage reservoir, (h) operating said engine in an internal-combustion mode when energy of compressed air is not available, said internal-combustion mode using air only from outside atmosphere, (i) performing periodical recharging of said at least one long-term storage reservoir with compressed air when said vehicle is not in motion, said recharging using an air-charging method selected from a set of air-charging methods including:
- (1) a first air-charging method wherein said air-charging means is a compressor driven by an electric motor using electric energy from an outside electric grid, and
- (2) a second air-charging method wherein said air-charging means is said engine operating as a compressor selectively driven by an electric motor using electric energy from an outside electric grid, and (j) using said control means for controlling the operation of said engine and said vehicle, whereby substituting energy of compressed air for some of the energy of fuel improves said vehicle fuel economy and reduces the amount of harmful exhaust pollutants emitted by said engine.

2. The method of claim 1 wherein said single-stage air-expansion mode further includes the step of receiving air from outside atmosphere into said cylinder chamber, whereby said charge of compressed air includes compressed air from said air reservoir means and atmospheric air.

3. The method of claim 1 wherein said two-stage air-expansion mode further includes the step of receiving air from outside atmosphere into said at least one of said at least two cylinders, whereby said at least one of said at least two cylinders contains a mixture of compressed air from said air-reservoir means and atmospheric air.

4. The method of claim 1 further including the steps of:
(a) operating said engine in a compression-braking mode during a descent of said vehicle from a higher altitude to a lower altitude by repeatedly performing an air-compression cycle wherein a charge of atmospheric air is compressed in said engine and displaced into said at least one long-term storage reservoir for storage therein, whereby some of potential energy of said vehicle is converted into energy of compressed air stored in said at least one long-term storage reservoir, and
(b) operating said engine in an air-expansion mode during a subsequent ascent of said vehicle from a lower altitude to a higher altitude by repeatedly performing an air-expansion cycle wherein a charge of compressed air received from said at least one long-term reservoir is expanded in said engine, whereby energy of compressed air stored in said at least one long-term storage reservoir is converted into an increase in potential energy of said vehicle, whereby some of the energy used to restrict the speed of said vehicle descent is recovered during subsequent ascent, and whereby said vehicle fuel consumption is reduced.

5. The method of claim 1 further including the steps of:
(a) depositing compressed air displaced from said engine into said at least one short-term storage reservoir during said vehicle braking, and discharging said compressed air from said at least one short-term storage reservoir into said engine and using it for said vehicle propulsion during subsequent vehicle acceleration,
(b) using compressed air stored in said at least one long-term storage reservoir for said vehicle propulsion whenever air pressure in said at least one short-term reservoir drops below a predetermined level, and
(c) using said internal-combustion mode for said vehicle propulsion when air pressure in said at least one short-term storage reservoir and in said at least one long-term storage reservoir drops below a predetermined level.

6. The method of claim 5 further including the step of terminating operation of said engine during said vehicle stops when said vehicle is not in motion.

7. The method of claim 1 wherein the step of providing said air-charging means further includes the step of providing a means for air compression that can be connected to said at least one long-term storage reservoir for charging said long-term storage reservoir with compressed air and can be driven by an electric motor powered by energy from an electric energy source located outside of said vehicle when said vehicle is not in motion.

8. The method of claim 7 wherein said means for air compression is an on-board installation that is an integral part of the vehicle.

9. The method of claim 8 wherein said on-board installation includes said engine operating as a compressor.

10. A method of operating a vehicle, said method comprising the steps of:
(a) providing an engine that can selectively operate as a compressor, as an air motor, and as an internal combustion engine, said engine being mounted in said vehicle for its propulsion and braking,
(b) providing a short-term air-storage means for storing compressed air pumped by said engine when operating as a compressor, said short-term air-storage means being mounted in said vehicle and selectively connected to said engine,
(c) providing a long-term air-storage means for storing compressed air, said long-term air-storage means being mounted in said vehicle and selectively connected to said engine,
(d) providing an air-charging means for pumping compressed air into said long-term air-storage means, said air-charging means being driven by an electric motor that receives energy from an electric energy source outside of said vehicle when said vehicle is not in motion,
(e) providing a control means for controlling operation of said engine and said vehicle in response to driver's demands and in accordance with a control program incorporated in said control means,
(f) providing a gas exchange controlling means for accommodating gas flow into, inside and out of said engine, and between said engine and said short-term and long-term air-storage means,
(g) operating said engine in an air-compression mode in response to a demand for a vehicle braking force, said air-compression mode including operation in a mode selected from a set of modes comprising:
  (1) a single-stage air-compression mode including operating said engine as a single-stage compressor, said single-stage compressor pumping compressed air into said short-term air-storage means, and
  (2) a two-stage air-compression mode including operating said engine as a two-stage compressor, said two-stage compressor pumping compressed air into said short-term air-storage means,
(h) operating said engine in an air-expansion mode in response to a demand for a vehicle propulsion force, wherein said engine receives compressed air from said short-term air-storage means when air pressure in said short-term air-storage means is above a first predetermined level, and wherein said engine receives compressed air from said long-term air-storage means when air pressure in said short-term air-storage means is below said first predetermined level and air pressure in said long-term air-storage means is above a second predetermined level, said air-expansion mode including operation in a mode selected from a set of modes comprising:
(1) a single-stage air-motor mode wherein said compressed air is subjected to a single-stage expansion in said engine and performs work on said engine pistons,
(2) a single-stage four-stroke air-power-assisted mode wherein said compressed air is subjected to a single-stage expansion in said engine and is further used to perform a four-stroke internal-combustion cycle in said engine, whereby work of air expansion supplements work performed in said four-stroke internal-combustion cycle,
(3) a single-stage two-stroke air-power-assisted mode wherein said compressed air is used to perform a two-stroke internal-combustion cycle in said engine, whereby energy of said compressed air supplements work performed in said two-stroke internal-combustion cycle,
(4) a two-stage air-motor mode wherein said compressed air is subjected to a two-stage expansion in said engine and performs work on said engine pistons,
(5) a two-stage four-stroke air-power-assisted mode wherein said compressed air is subjected to a two-stage expansion in said engine and is further used to perform a four-stroke internal-combustion cycle in said engine, whereby work of air expansion supplements work performed in said four-stroke internal-combustion cycle, and
(6) a two-stage two-stroke air-power-assisted mode wherein said compressed air is used to perform a two-stroke internal-combustion cycle in said engine, whereby energy of said compressed air supplements work performed in said two-stroke internal-combustion cycle,
(i) operating said engine as an internal-combustion engine using air only from outside atmosphere in response to a demand for a vehicle propulsion force when air pressure in said short-term air-storage means is below said first predetermined level and air pressure in said long-term air-storage means is below said second predetermined level,
(j) performing periodical recharging of said long-term air-storage means with compressed air when said vehicle is not in motion, said recharging using an air-charging method selected from a set of air-charging methods including:
(1) a first air-charging method wherein said air-charging means is a compressor driven by said electric motor, and
(1) a second air-charging method wherein said air-charging means is said engine operating as a compressor selectively driven by said electric motor,
and
(k) using said control means for controlling the operation of said engine and said vehicle, whereby substituting energy of compressed air for some of the energy of fuel improves said vehicle fuel economy and reduces the amount of harmful exhaust pollutants emitted by said engine.

\* \* \* \* \*